United States Patent
Shi et al.

(10) Patent No.: US 12,271,078 B2
(45) Date of Patent: Apr. 8, 2025

(54) HIGH PERFORMANCE BACKLIGHT DEVICE USING PHOTONIC INTEGRATED CIRCUITS

(71) Applicant: Meta Platforms Technologies, LLC, Menlo Park, CA (US)

(72) Inventors: Zhimin Shi, Bellevue, WA (US); James Ronald Bonar, Redmond, WA (US); Wanli Chi, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 272 days.

(21) Appl. No.: 17/985,063

(22) Filed: Nov. 10, 2022

(65) Prior Publication Data
US 2023/0194925 A1 Jun. 22, 2023

Related U.S. Application Data

(60) Provisional application No. 63/292,574, filed on Dec. 22, 2021.

(51) Int. Cl.
*G02F 1/13357* (2006.01)
*G02B 27/01* (2006.01)

(52) U.S. Cl.
CPC ... *G02F 1/133605* (2013.01); *G02B 27/0172* (2013.01); *G02F 1/133606* (2013.01);
(Continued)

(58) Field of Classification Search
None
See application file for complete search history.

(56) References Cited

U.S. PATENT DOCUMENTS

| | | | | |
|---|---|---|---|---|
| 7,944,616 B2* | 5/2011 | Mukawa | ............ | G02B 27/0172 359/633 |
| 8,565,560 B2* | 10/2013 | Popovich | ............. | G02B 5/1828 385/10 |

(Continued)

OTHER PUBLICATIONS

International Preliminary Report on Patentability for International Application No. PCT/US2022/053600, mailed Jul. 4, 2024, 8 pages.

(Continued)

*Primary Examiner* — Jerry Rahll
(74) *Attorney, Agent, or Firm* — Mannava & Kang, P.C.

(57) ABSTRACT

Embodiments of the present disclosure relate to a high performance backlight device with photonic integrated circuits. The backlight device includes a light source assembly, a multi-mode slab waveguide, and an out-coupling assembly. The light source assembly includes one or more light sources that generate light in accordance with emission instructions, and a de-speckling mechanism that conditions the generated light to mitigate speckle. The multi-mode slab waveguide in-couples the conditioned light and expands the in-coupled conditioned light in two dimensions to form a homogenous area of conditioned light within a region of the multi-mode slab waveguide. The out-coupling assembly out-couples the conditioned light from the region in a direction normal to the two dimensions, wherein a light modulation layer forms an image from the out-coupled conditioned light.

20 Claims, 18 Drawing Sheets

(52) U.S. Cl.
CPC .... *G02F 2201/05* (2013.01); *G02F 2201/302* (2013.01); *G02F 2201/38* (2013.01)

(56) References Cited

U.S. PATENT DOCUMENTS

| | | | |
|---|---|---|---|
| 10,527,854 B1 * | 1/2020 | Trail | G02B 27/0081 |
| 2006/0228073 A1 * | 10/2006 | Mukawa | G02B 5/18 |
| | | | 385/31 |
| 2008/0247150 A1 | 10/2008 | Itoh et al. | |
| 2012/0281943 A1 | 11/2012 | Popovich et al. | |
| 2013/0021586 A1 * | 1/2013 | Lippey | G02B 27/48 |
| | | | 353/69 |
| 2018/0284440 A1 * | 10/2018 | Popovich | G02B 27/0093 |
| 2018/0299251 A1 | 10/2018 | Liba et al. | |
| 2021/0223548 A1 | 7/2021 | Maimone et al. | |
| 2021/0239997 A1 | 8/2021 | St. Hilaire | |

OTHER PUBLICATIONS

International Search Report and Written Opinion for International Application No. PCT/US2022/053600, mailed Apr. 19, 2023, 10 pages.

* cited by examiner

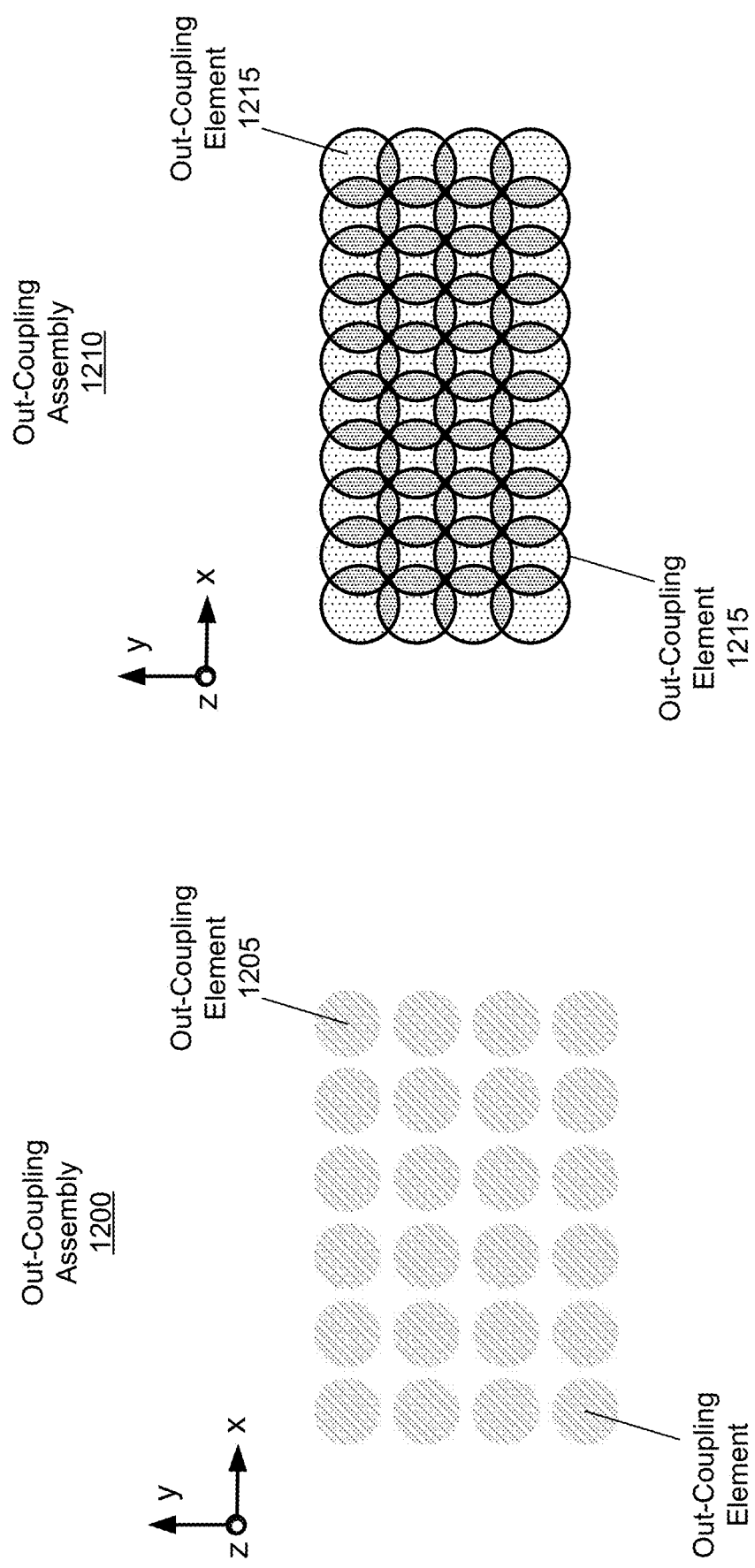

HIGH PERFORMANCE BACKLIGHT DEVICE USING PHOTONIC INTEGRATED CIRCUITS

CROSS REFERENCE TO RELATED APPLICATIONS

This application claims a priority and benefit to U.S. Provisional Patent Application Ser. No. 63/292,574, filed Dec. 22, 2021, which is hereby incorporated by reference in its entirety.

FIELD OF THE INVENTION

The present disclosure relates generally to a display, and specifically relates to a high performance backlight device for a display assembly that uses photonic integrated circuits.

BACKGROUND

Coherent light sources (e.g., lasers) can provide very high brightness compared to other types of light sources. Photonic integrated circuits have been proposed to deliver light from a light source to a backplane through a single-mode waveguide where light is emitted using output-coupling mechanisms such as waveguide grating couplers. Such approach can have good angular spectrum control and high light efficiency. However, there are several challenges for such a display architecture. First, the long coherence length of lasers can cause unwanted interference effects that lead to speckles, blinking, and non-uniformity of an image presented to a user. Second, the desire for achieving a small pitch (e.g., high pixels per inch (PPI)) can lead to undesired crosstalk (and speckle) between neighboring pixels, as well as neighboring waveguides (e.g., columns). Third, the desire for achieving the small pitch (e.g., high PPI) can further imposes technical challenges on controlling an angular cone of light emission, as well as efficiency/crosstalk difficulty in aligning with a display panel (e.g., liquid crystal panel).

SUMMARY

A display assembly (e.g., laser display) presented herein includes a high performance backlight device with photonic integrated circuits and a spatial modulator (e.g., liquid crystal (LC) array). The backlight device may include a light assembly, a slab expansion region, and an out-coupling assembly. The light assembly may include one or more light sources that generate coherent light in one or more color channels. The one or more light sources may include one or more de-speckling mechanisms that randomize relative phases of the generated coherent light. The light from the light assembly may be in-coupled into the slab expansion region. The slab expansion region may be a multi-mode slab waveguide that is relatively unconstrained within a plane of light propagation. The in-coupled light may expand within the slab expansion region including an out-coupling area where the out-coupling assembly is located. The out-coupling assembly may include one or more gratings that are configured to out-couple light from the slab expansion region and focus the out-coupled light on corresponding pixels of the spatial modulator. The spatial modulator may modulate the out-coupled light to form an image which can be output from the display assembly. The display assembly can be part of a head-mounted display (i.e., headset).

Embodiments of the present disclosure are directed to a backlight device that includes a light source assembly, a multi-mode slab waveguide, and an out-coupling assembly. The light source assembly includes one or more light sources configured to generate light in accordance with emission instructions, and a de-speckling mechanism configured to condition the generated light to mitigate speckle. The multi-mode slab waveguide is configured to in-couple the conditioned light and expand the in-coupled conditioned light in two dimensions to form a homogenous area of conditioned light within a region of the multi-mode slab waveguide. The out-coupling assembly is configured to out-couple the conditioned light from the region in a direction normal to the two dimensions, wherein a light modulation layer (e.g., display panel) forms an image from the out-coupled conditioned light.

Embodiments of the present disclosure are further directed to a method for operating a backlight device. The method comprising: generating light in accordance with emission instructions; conditioning the generated light to mitigate speckle; expanding the conditioned light in two dimensions to form a homogenous area of conditioned light within a region; out-coupling the conditioned light from the region in a direction normal to the two dimensions; and forming an image from the out-coupled conditioned light.

Embodiments of the present disclosure are further directed to a display assembly that includes a display panel a backlight device coupled to the display panel. The backlight device includes a light source assembly, a multi-mode slab waveguide, and an out-coupling assembly. The light source assembly generate light in accordance with emission instructions and conditions the generated light to mitigate speckle. The multi-mode slab waveguide is configured to in-couple the conditioned light and expand the in-coupled conditioned light in two dimensions to form a homogenous area of conditioned light within a region of the multi-mode slab waveguide. The out-coupling assembly is configured to out-couple the conditioned light from the region in a direction normal to the two dimensions. The display panel forms an image from the out-coupled conditioned light.

BRIEF DESCRIPTION OF THE DRAWINGS

FIG. 12A is a top view of an out-coupling assembly with spatially non-overlapping out-coupling elements, in accordance with one or more embodiments.

FIG. 12B is a top view of an out-coupling assembly with spatially overlapping out-coupling elements, in accordance with one or more embodiments.

Figure 1A:
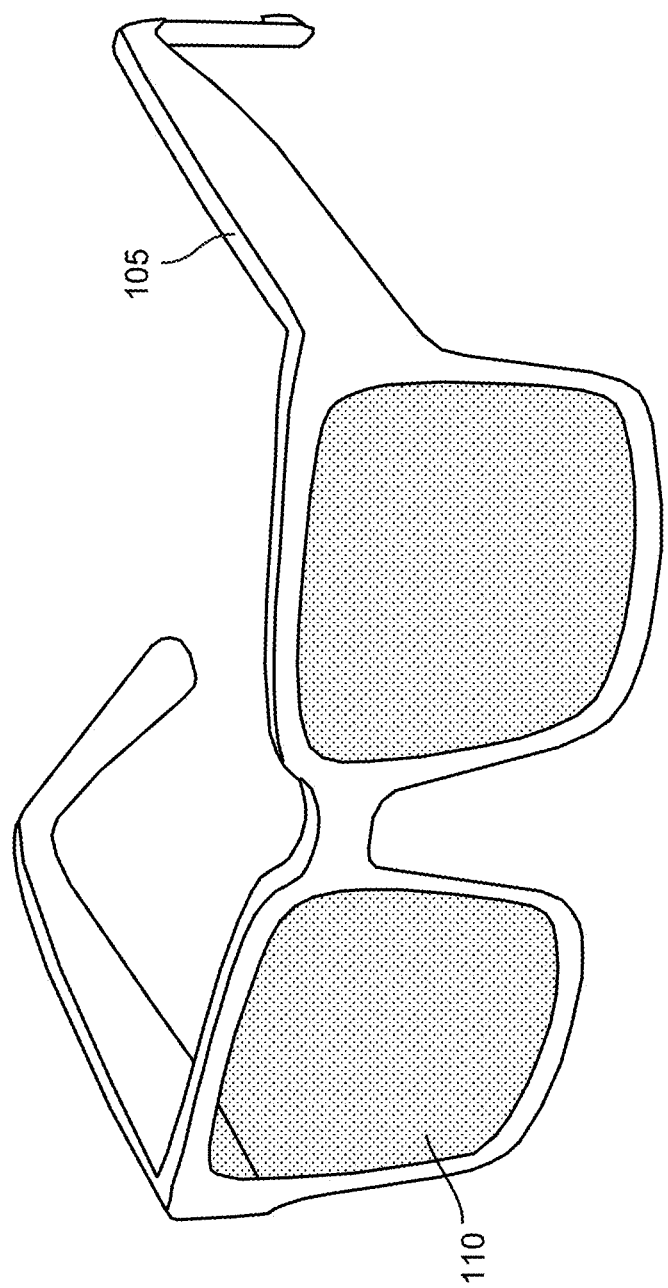
FIGS. 1A and 1B are diagrams of head-mounted displays (HMDs) that include near-eye displays (NEDs), in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A display assembly (e.g., laser display) presented herein includes a high performance backlight device with photonic integrated circuits and a spatial modulator (e.g., liquid crystal (LC) array). The backlight device may include a light assembly, a slab expansion region, and an out-coupling assembly. The light assembly may include one or more light sources that generate coherent light in one or more color channels. The one or more light sources may include one or more de-speckling mechanisms that randomize relative phases of the generated coherent light. The light from the light assembly may be in-coupled into the slab expansion region. The slab expansion region may be a multi-mode slab waveguide that is relatively unconstrained within a plane of light propagation. The in-coupled light may expand within the slab expansion region including an out-coupling area where the out-coupling assembly is located. The out-coupling assembly may include one or more gratings that are configured to out-couple light from the slab expansion region and focus the out-coupled light on corresponding pixels of the spatial modulator. The spatial modulator may modulate the out-coupled light to form an image which can be output from the display assembly.

An integrated architecture of backlight device presented herein can be fabricated using standard lithography-based nano-manufacturing processing, and is scalable to wafer-level or panel-level manufacturing. The light assembly of the backlight device presented herein operates as a light source distribution module that can provide a large number of optical fields (modes) towards each out-coupling pixel of the spatial modulator (i.e., light modulation panel). The randomized phase fluctuation mechanism applied at the light assembly can significantly reduce the speckling effect out of each pixel and among neighboring pixels of the spatial modulator. Meanwhile, all the modes (i.e., optical fields) are still well preserved such that the out-coupled light can have a controllable emission angular profile for achieving high efficiency of the out-coupled light. The out-coupling mechanism can be designed on an array level for producing an array of focused spots at a desired distance for achieving efficient light delivery through the light modulation panel (e.g., LC panel). The out-coupling mechanism can be further designed to spatially multiplex multiple colors (e.g., Red, Green, Blue color channels) for producing independently controlled arrays of focused spots at a desired distance to achieve efficient multi-color light delivery through the light modulation panel. The backlight device presented herein does not include single mode waveguides, and therefore can achieve uniform angular output profile in all directions for each pixel of the light modulation panel.

The display assembly presented herein may be integrated into a wearable device (e.g., a head-mounted displays or headset), a mobile device, or any other hardware platform capable of providing artificial reality content to a user.

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (or headset) connected to a host computer system, a standalone head-mounted display (or headset), a mobile device or computing system, or any other hardware platform capable of providing artificial reality content to one or more viewers.

Figure 1B:
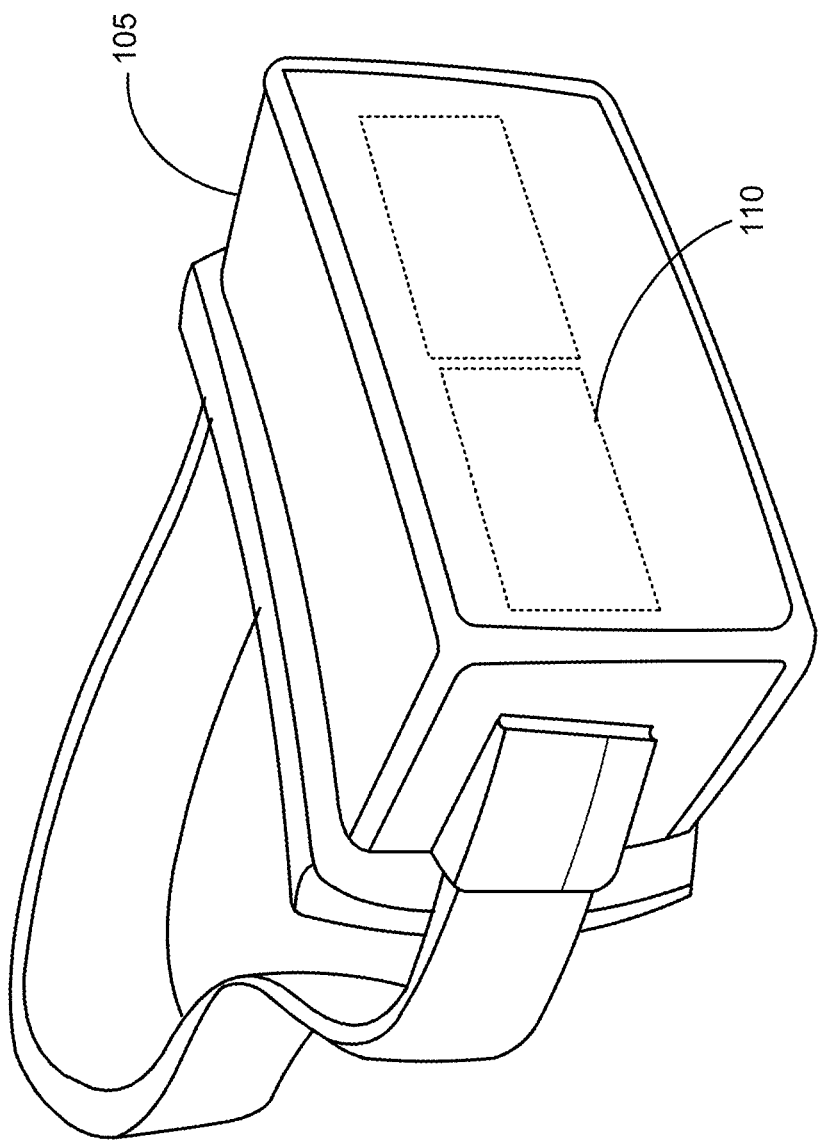

Figures (FIGS. 1A and 1B are diagrams of head-mounted displays (HMDs) 100 that include near-eye displays (NEDs) 110, in accordance with one or more embodiments. The NED 110 may present media to a user. Examples of media that may be presented by the NED 110 include one or more images, video, audio, or some combination thereof. In some embodiments, audio may be presented via an external device (e.g., speakers and/or headphones) that receives audio information from the HMD 100, a console (not shown), or both, and presents audio data to the user based on the audio information. The HMD 100 is generally configured to operate as a VR HMD. However, in some embodiments, the HMD 100 may be modified to also operate as an AR HMD, a MR HMD, or some combination thereof. For example, in some embodiments, the HMD 100 may augment views of a physical, real-world environment with computer-generated elements (e.g., still images, video, sound, etc.).

The HMD 100 shown in FIG. 1A or FIG. 1B may include a frame 105 and a display 110. The frame 105 may include one or more optical elements that together display media to a user. That is, the display 110 may be configured for a user to view the content presented by the HMD 100. The display 110 may include at least one source assembly to generate image light to present optical media to an eye of the user. The source assembly may include, e.g., a source, an optics system, or some combination thereof.

FIGS. 1A and 1B are merely examples of a virtual reality system, and the display systems described herein may be incorporated into further such systems.

Figure 2:
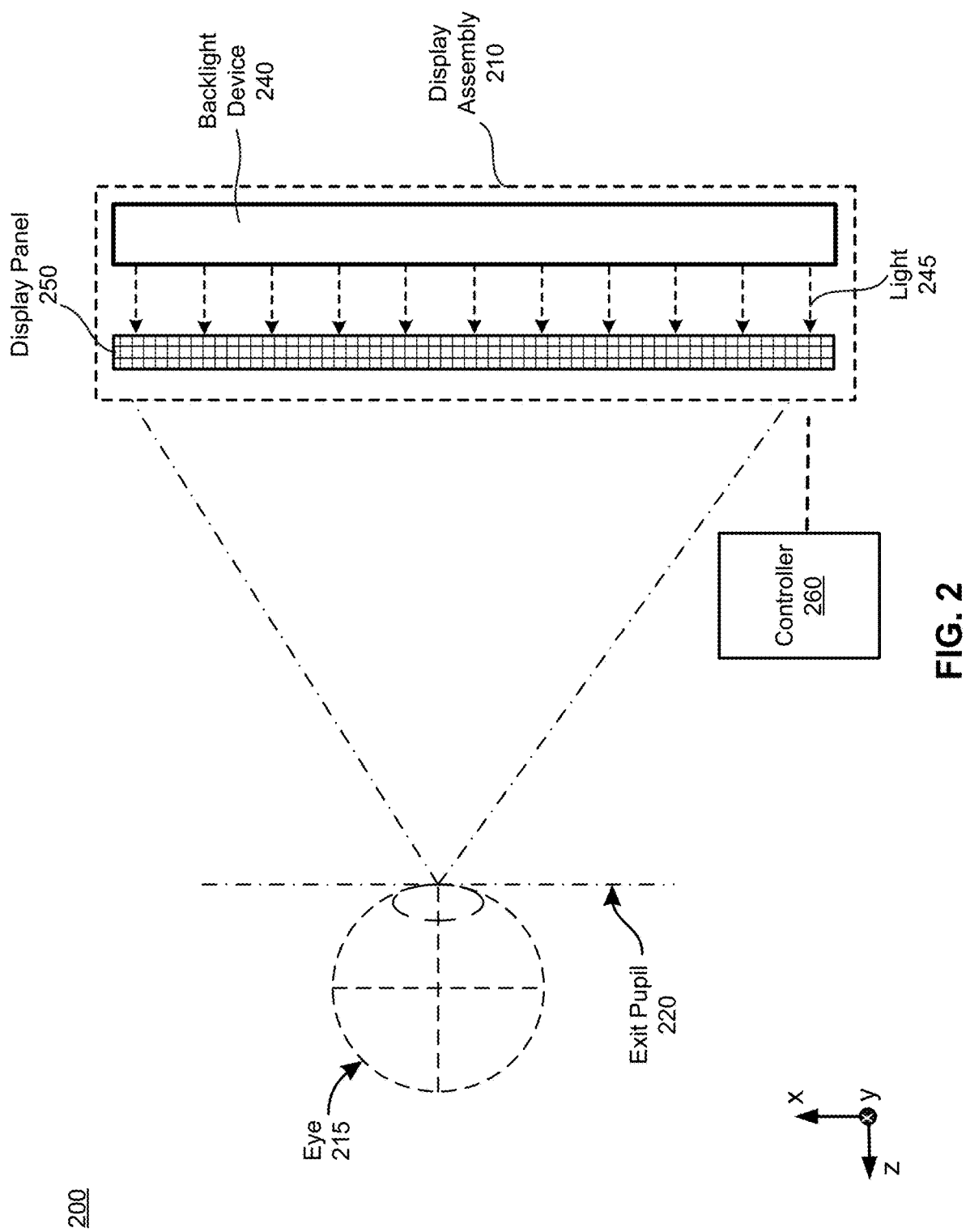
FIG. 2 is a cross-sectional view of a display assembly with a backlight device, in accordance with one or more embodiments.

FIG. 2 is a cross-sectional view 200 of a display assembly 210 with a backlight device 240, in accordance with one or more embodiments. In some embodiments, the display 110 may be an embodiment of the display assembly 210. The cross-sectional view 200 shows components of the display assembly 210, an exit pupil 220, as well as a controller 260 coupled to the display assembly 210. The display assembly 210 may include the backlight device 240 and a display panel 250. The exit pupil 220 is a location where an eye 215 may be positioned when a user wears the HMD 100. For purposes of illustration, FIG. 2 shows the cross section 200 associated with a single eye 215 and a single display assembly 210, but in alternative embodiments not shown, another display assembly that is separate from or integrated with the display assembly 210 shown in FIG. 2, may provide image light to another eye of the user.

The display assembly 210 may generate the image light and direct the image light to the eye 215 through the exit pupil 220. The display assembly 210 may be composed of one or more materials (e.g., plastic, glass, etc.) with one or more refractive indices that effectively decrease the weight and widen a field of view of the HMD 100. One or more optical elements (not shown in FIG. 2) may be located between the display assembly 210 and the eye 215. The optical elements may act to, by way of various examples, correct aberrations in image light emitted from the display assembly 210, magnify image light emitted from the display assembly 210, perform some other optical adjustment of image light emitted from the display assembly 210, or some combination thereof. Example optical elements may include an aperture, a Fresnel lens, a convex lens, a concave lens, a filter, or any other suitable optical element that may affect image light.

The backlight device 240 may emit light 245 through the display panel 250, e.g., based at least in part on emission instructions from the controller 260. The backlight device 240 may be configured to generate the light 245 as white light (visible light). The backlight device 240 may be a high performance backlight device that uses photonic integrated circuits for light sources. Details about a structure and operation of the backlight device 240 are provided below in relation to FIGS. 3 through 14.

The display panel 250 may spatially modulate the light 245 received from the backlight device 240 to generate image light (e.g., content). The display panel 250 is a spatial light modulator. In some embodiments, the display panel 250 may be a liquid crystal (LC) based (passive or active matrix), or some other type of display that spatially modulates the light 245 from the backlight device 240. In some embodiments, the display panel 250 includes a color filter array overlaying a LC array. The color filter array may be, e.g., a Bayer pattern, or some other color pattern. The light 245 from the backlight device 240 may be modulated by the color filter array and the LC array to form the image light. The display panel 250 may emit the image light towards the exit pupil 220. In some embodiments, the display panel 250 includes an optical element (not shown in FIG. 2) that directs the image light towards the exit pupil 220. The optical element of the display panel 250 may magnify the image light, correct optical errors associated with the image light, and present the corrected image light to a user of the HMD 100. The optical element of the display panel 250 may direct the magnified and/or corrected image light to the exit pupil 220 for presentation to a user wearing the HMD 100. In various embodiments, the optical element of the display panel 250 can be implemented as one or more optical elements. Example optical elements included in the optical element of the display panel 250 may include: an aperture, a Fresnel lens, a convex lens, a concave lens, a filter, a reflecting surface, or any other suitable optical element that affects image light. Additional details about a structure and operation of the display panel 250 are provided below in relation to FIG. 7.

The controller 260 may control components of the display assembly 210. The controller 260 may generate emission instructions for the display assembly 210. The controller 260 may provide the emission instructions to the backlight device 240. The emission instructions from the controller 260 may include electrical signals (e.g., voltage signals or current signals) that control light emission from the backlight device 240. For example, the electrical signals having higher amplitude levels (e.g., higher voltage levels or higher current levels) generated by the controller 260 and provided to the backlight device 240 may prompt the backlight device 240 to emit the light 245 having a higher brightness level. And, vice versa for the electrical signals generated by the controller 260 having lower amplitude levels. The controller 260 may further control the display panel 250 to form the image light from the light 245.

Figure 3:
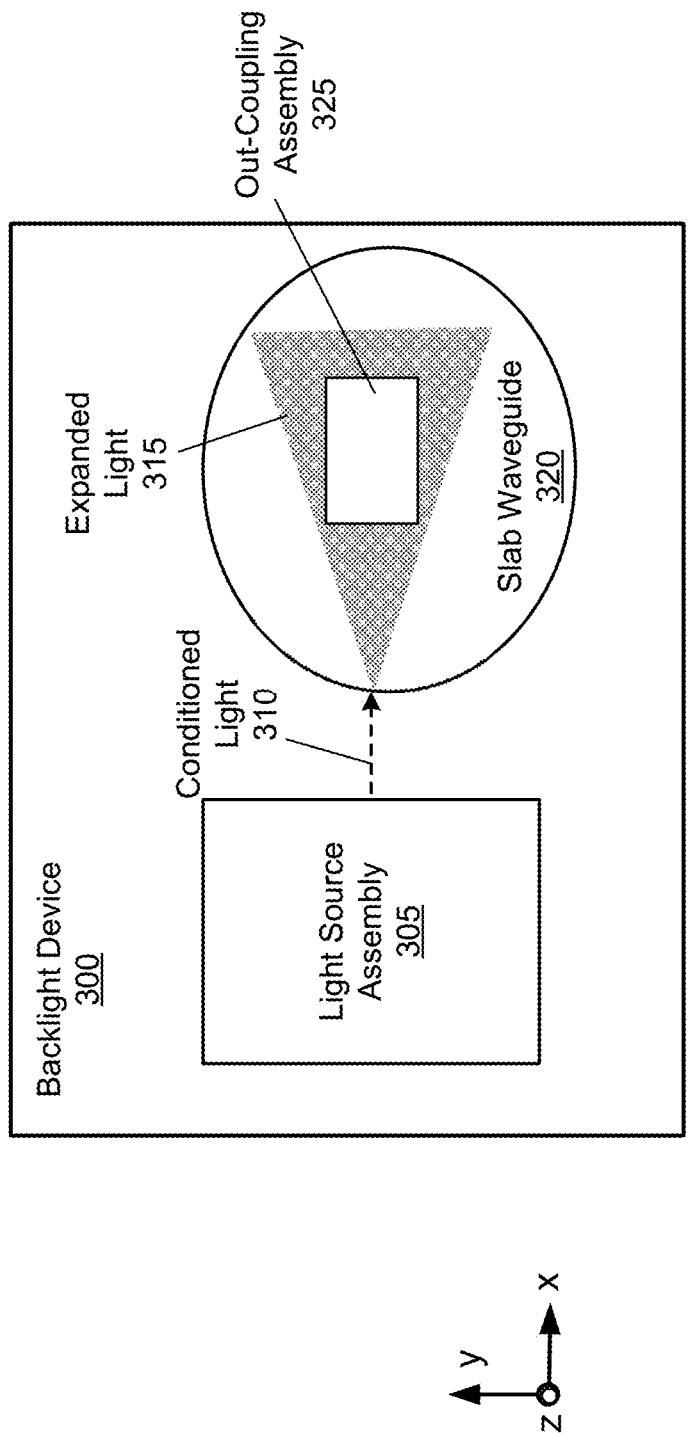
FIG. 3 illustrates an example backlight device, in accordance with one or more embodiments.

FIG. 3 illustrates an example backlight device 300, in accordance with one or more embodiments. The backlight device 300 may be used as the backlight device 240. The backlight device 300 for a light modulation layer (i.e., spatial light modulator, not shown in FIG. 3). The backlight device 300 has a novel architecture based on a photonic integrated circuit that is constructed for advanced display panels. The backlight device 300 may include a light source assembly 305, a slab waveguide 320, and an out-coupling assembly 325. The light source assembly 305 and the slab waveguide 320 may be mounted on a same substrate to form the backlight device 300. Alternatively, the light source assembly 305 and the slab waveguide 320 may be mounted on different substrates. Alternatively, the light source assembly 305 may be mounted directly to the slab waveguide 320. The backlight device 300 may include additional components not shown in FIG. 3.

The light source assembly 305 may generate and output conditioned light 310. The light source assembly 305 may include one or more light sources, one or more de-speckling mechanisms, one or more beam splitters, one or more color combiners, one or more mode converters/power equalizers. Each light source in the light source assembly 305 may be a laser (e.g., a diode laser, vertical-cavity surface-emitting laser (VCSEL), fiber laser, heterogeneously integrated laser, hybrid laser, etc.), a super-luminescent light emitting device (SLED), a nonlinear light source (a four wave mixing (FWM) light source, second harmonic generator (SHG) light source, third harmonic generator (THG) light source, sum-frequency generator (SFG) light source, parametric down-converter (PDC) light source, etc.), some other type of light source that generates conditioned light, or some combination thereof.

The light source assembly 305 may operate as a light source distribution module that transfers light emitted from the one or more light sources to a group of input waveguides, whose ends may be distributed along a perimeter of the slab waveguide 320. The light sources together with the input waveguides may form coherent light sources. The use of coherent light sources may generate bright images, but the coherent light sources can interfere with each other producing speckle effects. To mitigate the speckle effects, one or more de-speckling mechanisms may be applied within the light source assembly 305 to randomize relative phases of light coming out of different input waveguides. Thus, the light source assembly 305 may include phase modulators (i.e., phase randomizers) that randomize relative phases of light out-coupled from the input waveguides of the light source assembly 305. A phase randomizer in the light source assembly 305 may be an electro-optic phase modulator, thermal-optic phase modulator, mechanical-optic phase modulator, some other type of phase modulator, or some combination thereof.

A beam splitter of the light source assembly 305 may split a single light beam originating from at least one light source of the light source assembly 305 into multiple light beams, e.g., for feeding multiple output ports of the light source assembly 305 coupled to the slab waveguide 320. The beam splitter of the light source assembly 305 may thus provide coupling to the multiple output ports of the light source assembly 305. Examples of the beam splitter that can be employed within the light source assembly 305 may include, e.g., a fiber-based beam splitter, tap coupler, on-chip star coupler, multi-mode interferometer (MMI) coupler, Mach-Zehnder interferometer (MZI) coupler, other type of directional coupler, or some combination thereof.

A color combiner of the light source assembly 305 may combine light of different color channels (e.g., Red, Green, and Blue color channels) into combined color light. Examples of the color combiner that can be employed within the light source assembly 305 may include, e.g., multiplexers, demultiplexers, polarization converters, polarization combiners, ring-resonator-based couplers, other type of color combiner, or some combination thereof.

A mode converter/power equalizer of the light source assembly 305 may be configured to modify a mode profile of light along an out-of-plane direction. The mode converter/power equalizer may be also configured to balance a power distribution among different supported modes. In some embodiments, the light source assembly 305 includes one or more electronic bus lines for transmitting power, control information and data. The light source assembly 305 may further include integrated electronic circuitry for light source control. The integrated electronic circuitry in the light source assembly 305 may include electronic-conductive vias through photonic structures to be connected to light modulation cells of a light modulation layer. Additional details about components and operations of the light source assembly 305 are provided below in relation to FIGS. 5A-5C, FIG. 6 and FIG. 7.

The slab waveguide 320 may in-couple the conditioned light 310 and expand the in-coupled conditioned light in two dimensions (e.g., x and y dimensions) to form a homogenous area of expanded light 315 within a region of the slab waveguide 320. The slab waveguide 320 may thus operate as a multimode light expansion region or a free-propagation region. The slab waveguide 320 may be implemented as, e.g., a quasi-homogeneous medium where light can expand and propagate with a confinement in an out-of-plane direction (e.g., in the z direction). The slab waveguide 320 may include one or more elements (or layers) and may have one or more refractive indices. Details about possible structures and operation of the slab waveguide 320 are provided below in relation to FIG. 6, FIG. 7, FIGS. 9A-9C and FIGS. 10A-10B.

The out-coupling assembly 325 may out-couple the expanded light 315 from the region of the waveguide in a direction (e.g., z direction) normal to the two dimensions (e.g., x and y dimensions). A display panel (i.e., spatial light modulator or light modulation layer) external to the backlight device 300 may form an image from the out-coupled expanded light. The out-coupling assembly 325 may comprise one or more arrays of out-coupling elements to redirect light coming from the input waveguides of the light source assembly 305 through the slab waveguide 320 (i.e., free-propagation region) towards the display panel. An out-coupling element of the out-coupling assembly 325 is, e.g., a grating that is on top of the slab waveguide 320, bottom of the slab waveguide 320, both top/bottom of the slab waveguide 320, etched into one or more portions of the slab waveguide 320, etc. Details about possible structures and operation of the out-coupling assembly 325 are provided below in relation to FIG. 6, FIG. 7, FIG. 11, and FIGS. 12A-12D.

Figure 4B:
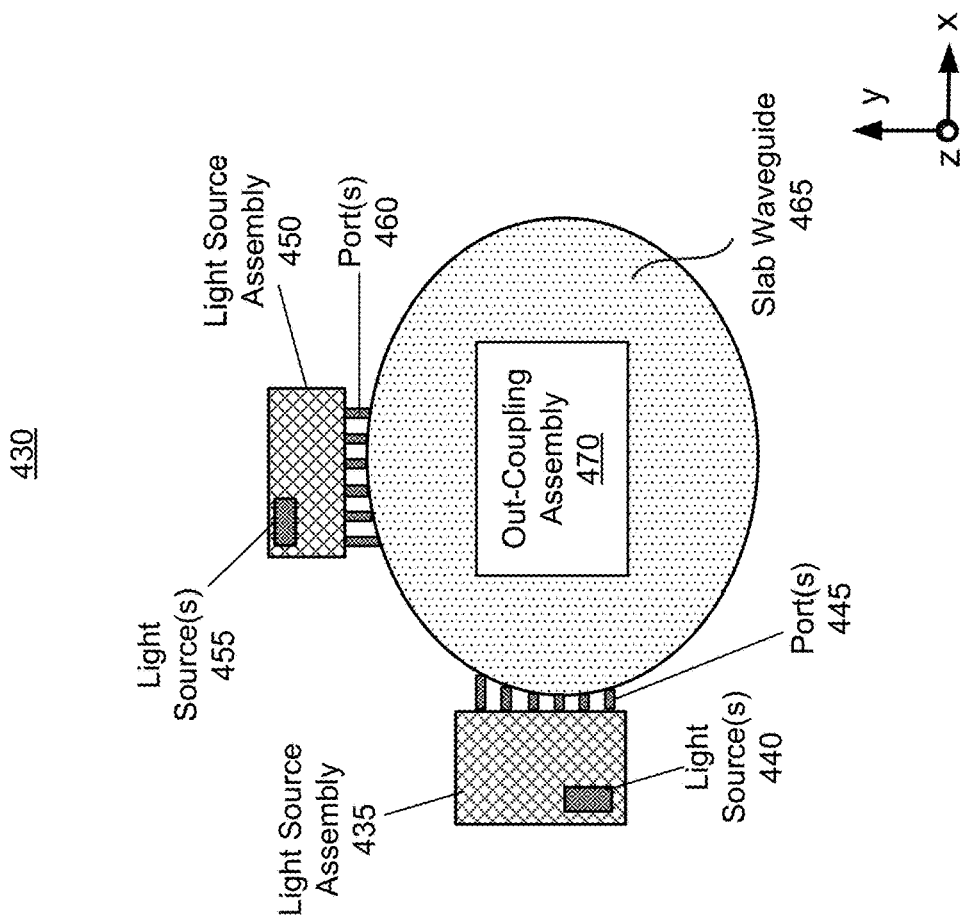
FIG. 4B illustrates an example backlight device with multiple light source assemblies, in accordance with one or more embodiments.
Figure 4A:
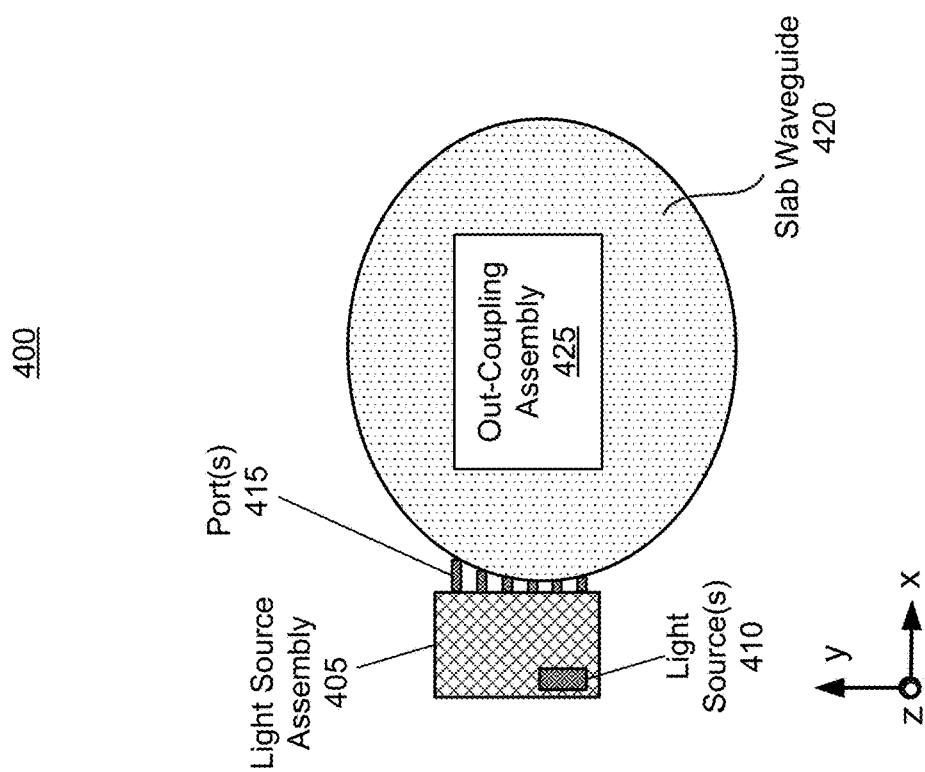
FIG. 4A illustrates an example backlight device with a single light source assembly, in accordance with one or more embodiments.

FIG. 4A illustrates an example backlight device 400 with a single light source assembly, in accordance with one or more embodiments. The backlight device 400 may include a light source assembly 405, a slab waveguide 420, and an out-coupling assembly 425. The single light source assembly 405 provides light at one side of the slab waveguide 420. The light source assembly 405 may include one or more light sources 410 that may be, e.g., a group of mutually incoherent light sources or light sources with fast-fluctuating phases in time. In this manner, the speckling effect may be mitigated (or completely avoided). The light source assembly 405 may direct light to the slab waveguide 420 via one or more ports 415. The light source assembly 405 may be an embodiment of the light source assembly 305.

The slab waveguide 420 is a light expansion region that allows light from each port 415 of the light source assembly 405 to expand and cover most of an out-coupling area of the slab waveguide 420 where the out-coupling assembly 425 is located. The slab waveguide 420 may be an embodiment of the slab waveguide 320. The out-coupling assembly 425 may include an array of elements that couple light from in-plane propagation across the slab waveguide 420 (e.g., propagation in x-y plane) to out-of-plane propagation (e.g., propagation in x-z plane and y-z plane) towards a light modulation layer (e.g., LC panel, not shown in FIG. 4A). The out-coupling assembly 425 may be an embodiment of the out-coupling assembly 325.

FIG. 4B illustrates an example backlight device 430 with multiple light source assemblies (e.g., two light source assemblies), in accordance with one or more embodiments. The backlight device 430 may include a light source assembly 435, a light source assembly 450, a slab waveguide 465, and an out-coupling assembly 470. Although two light source assemblies 435, 450 are shown in FIG. 4B, the backlight device 430 may include more than two light source assemblies (e.g., three or four light source assemblies). The light source assemblies 435, 450 provide light to the slab waveguide 465 from two different sides. Each light source assembly 435, 450 may include one or more respective light sources 440, 455 that may be, e.g., a group of mutually incoherent light sources or light sources with fast-fluctuating phases in time. In this manner, the speckling effect may be mitigated (or completely avoided). Each light source assembly 435, 450 may direct light to the slab waveguide 465 via one or more respective ports 445, 460. Each light source assembly 435, 450 may be an embodiment of the light source assembly 305.

The slab waveguide 465 is a light expansion region that allows light from each port 445, 460 to expand and cover most of an out-coupling area of the slab waveguide 465 where the out-coupling assembly 470 is located. The slab waveguide 465 may be an embodiment of the slab waveguide 320. The out-coupling assembly 470 may include an array of elements that couple light from in-plane propagation across the slab waveguide 465 (e.g., propagation in x-y plane) to out-of-plane propagation (e.g., propagation in x-z plane and y-z plane) towards a light modulation layer (not shown in FIG. 4B). The out-coupling assembly 470 may be an embodiment of the out-coupling assembly 325.

Figure 5A:
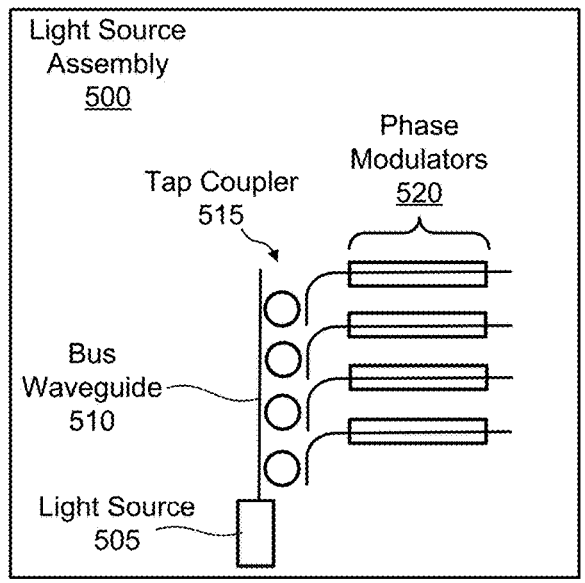
FIG. 5A illustrates a first example light source assembly of a backlight device, in accordance with one or more embodiments.

FIG. 5A illustrates an example light source assembly 500 of a backlight device (e.g., the backlight device 300), in accordance with one or more embodiments. FIG. 5A illustrates an example of using one light source to feed into multiple ports that launch light into a free-propagation region (i.e., slab waveguide) of the backlight device. The light source assembly 500 may be an embodiment of the light source assembly 305. The light source assembly 500 includes a light source 505, a bus (input) waveguide 510, a tap coupler 515, and phase modulators 520. The light source 505 may emit light that is in-coupled by the bus waveguide 510 and directed to the tap coupler 515. The light source 505 may emit light in different bands (i.e., different wavelengths) at different times. The tap coupler 515 may couple the bus waveguide 510 with the phase modulators 520 by splitting the light directed by the bus waveguide 510 into a plurality of light beams, each light beam fed to a respective phase modulator 520. The phase modulators 520 may randomize relative phases of the light beams to reduce (or eliminate) the speckle effect. Each phase modulator 520 may be connected to a respective output port of the light source assembly 500 (not shown in FIG. 5A), which than launches light into a free-propagation region (i.e., a light expansion region or slab waveguide, not shown in FIG. 5B) of the backlight device.

Figure 5B:
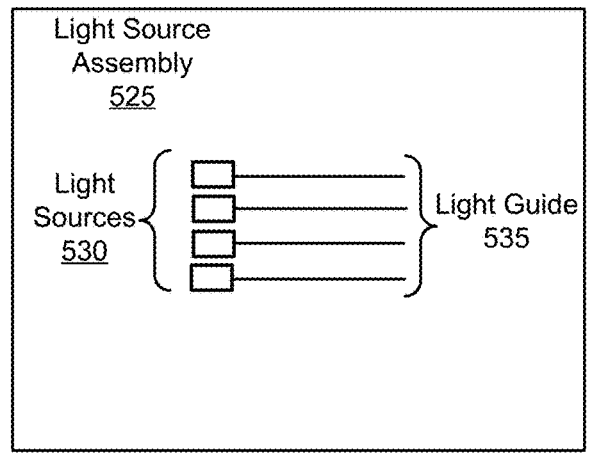
FIG. 5B illustrates a second example light source assembly of a backlight device, in accordance with one or more embodiments.

FIG. 5B illustrates an example light source assembly 525 of a backlight device (e.g., the backlight device 300), in accordance with one or more embodiments. The light source assembly 525 may be an embodiment of the light source assembly 305. The light source assembly 525 may include an array of light sources 530 and a light guide 535. The light sources 530 may be, e.g., mutually incoherent light sources, each light source 530 emitting a light beam to a connection (e.g., fiber connection) of the light guide 535. The light sources 530 may emit light in different color channels. Alternatively, the light sources 530 may emit light in the same color channel. Each individual connection of the light guide 535 may be connected to a respective output port of the light source assembly 525. Thus, each light source 530 feeds its own light beam to one output port of the light source assembly 525 (not shown in FIG. 5B), which then launches light into a free-propagation region (i.e., a light expansion region or slab waveguide, not shown in FIG. 5B) of the backlight device.

Figure 5C:
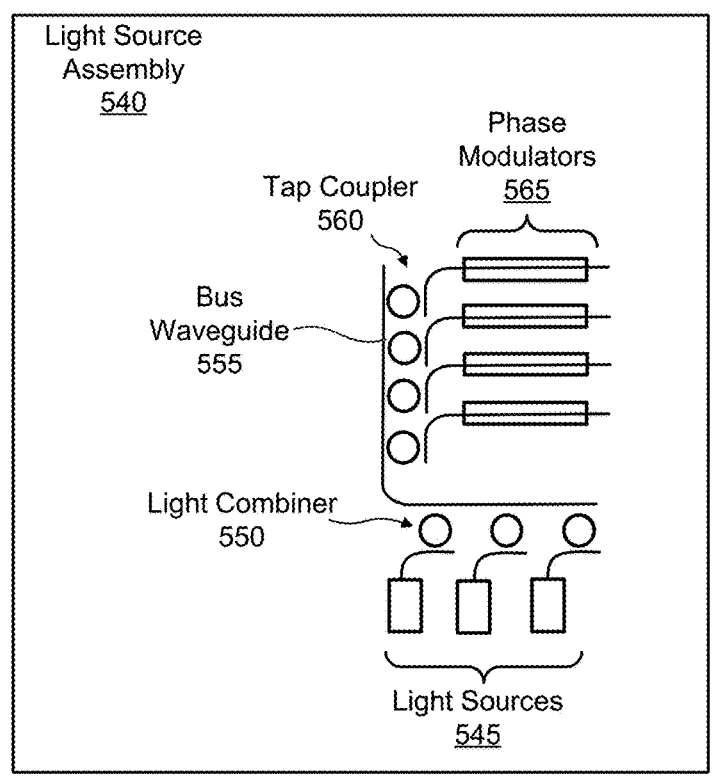
FIG. 5C illustrates a third example light source assembly of a backlight device, in accordance with one or more embodiments.

FIG. 5C illustrates an example light source assembly 540 of a backlight device (e.g., the backlight device 300), in accordance with one or more embodiments. The light source assembly 540 may be an embodiment of the light source assembly 305. The light source assembly 540 may include a plurality of light sources 545, a light combiner 550, a bus waveguide 555, a tap coupler 560, and a plurality of phase modulators 565. Each light source 545 emits a light beam of, e.g., a respective color channel. The light sources 545 may emit light beams at the same time. Alternatively, emission from the light sources 545 may be time-multiplexed. The light combiner 550 (e.g., ring-resonator based coupler) may combine light generated by the light sources 545 to generated combined light (e.g., color light of multiple color channels). The bus (input) waveguide 555 may in-couple the combined light from the light combiner 550 and direct the combined light to the tap coupler 560. The tap coupler 560 may couple the bus waveguide 555 with the phase modulators 565 by splitting the combined light directed by the bus waveguide 555 into a plurality of light beams, each light beam fed to a respective phase modulator 565. The phase modulators 565 may randomize relative phases of the light beams. Each phase modulator 565 may be connected to a respective output port of the light source assembly 540 (not shown in FIG. 5C), which then launches light into a free-propagation region (i.e., a light expansion region or slab waveguide, not shown in FIG. 5C) of the backlight device. Thus, FIG. 5C illustrates an example of employing multiple light sources to feed into multiple output ports of the light source assembly 540, wherein the output ports launch light into the free-propagation region of the backlight device.

Figure 6:
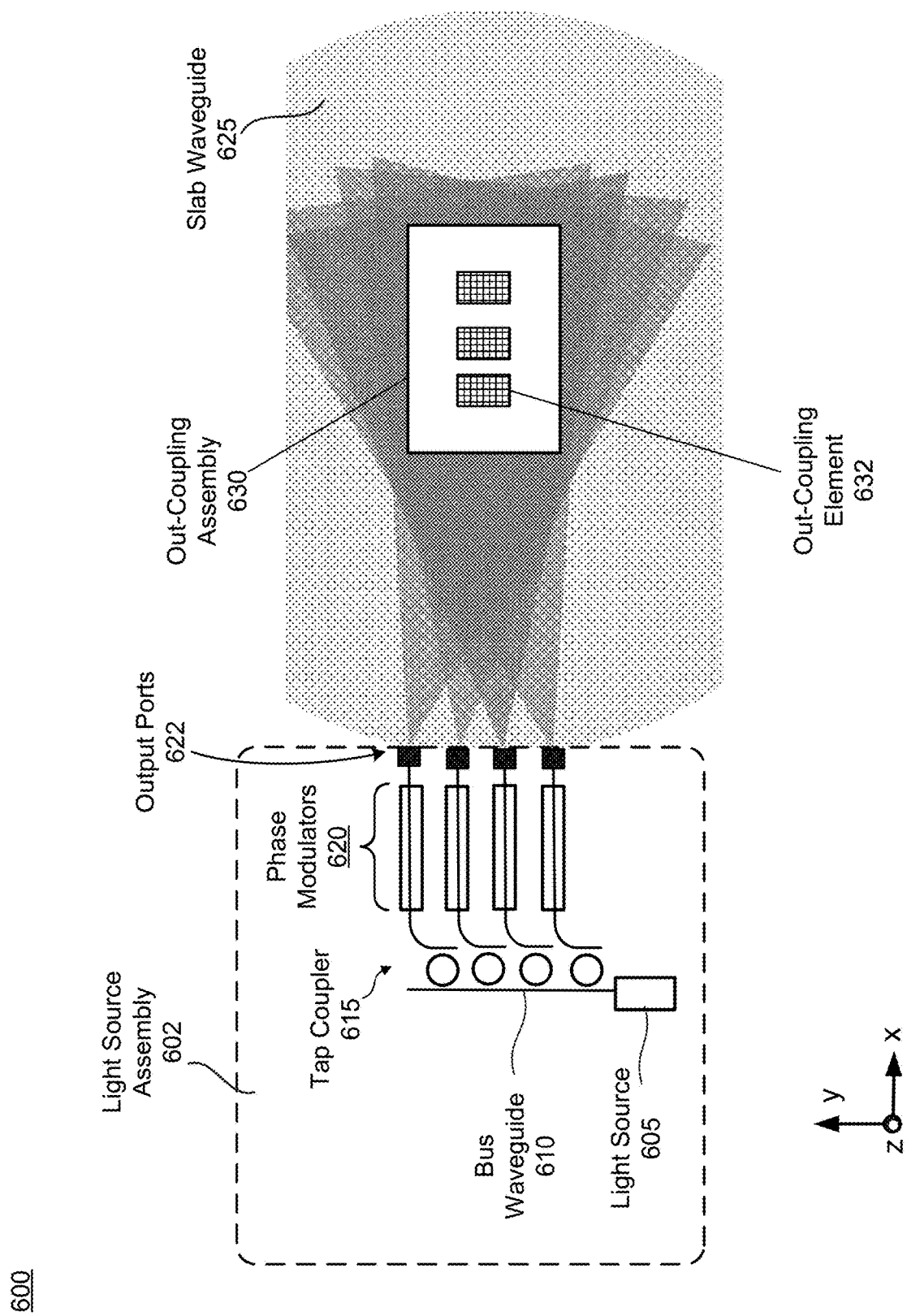
FIG. 6 is a top view of a backlight device, in accordance with one or more embodiments.

FIG. 6 is a top view of a backlight device 600, in accordance with one or more embodiments. The backlight device 600 may include a light source assembly 602, a slab waveguide 625, and an out-coupling assembly 630. The backlight device 600 may be an embodiment of the backlight device 300. The light source assembly 602 may include a light source 605, a bus waveguide 610, a tap coupler 615, a plurality of phase modulators 620, and a plurality of output ports 622. A single light source 605 may feed the output ports 622 with light beams having relative phases directly randomized by the phase modulators 620. The light source assembly 602 may be an embodiment of the light source assembly 500. The light beams may represent conditioned light that is launched from the output ports 622 into the slab waveguide 625 for expansion.

The slab waveguide 625 may operate as a multi-mode slab waveguide that in-couples the conditioned light and expands the in-coupled conditioned light in two dimensions (e.g., x and y dimensions) to form a homogenous area of conditioned light within a region of the occupied by the out-coupling assembly 630. The out-coupling assembly 630 out-couple the expanded conditioned light from the region in a direction normal to the two dimensions (e.g., in z direction). The out-coupling assembly 630 may include one or more out-coupling elements 632. Each out-coupling element 632 may be a grating element or some other diffraction element attached to the slab waveguide 625, etched into the slab waveguide 625, or some combination thereof.

Figure 7:
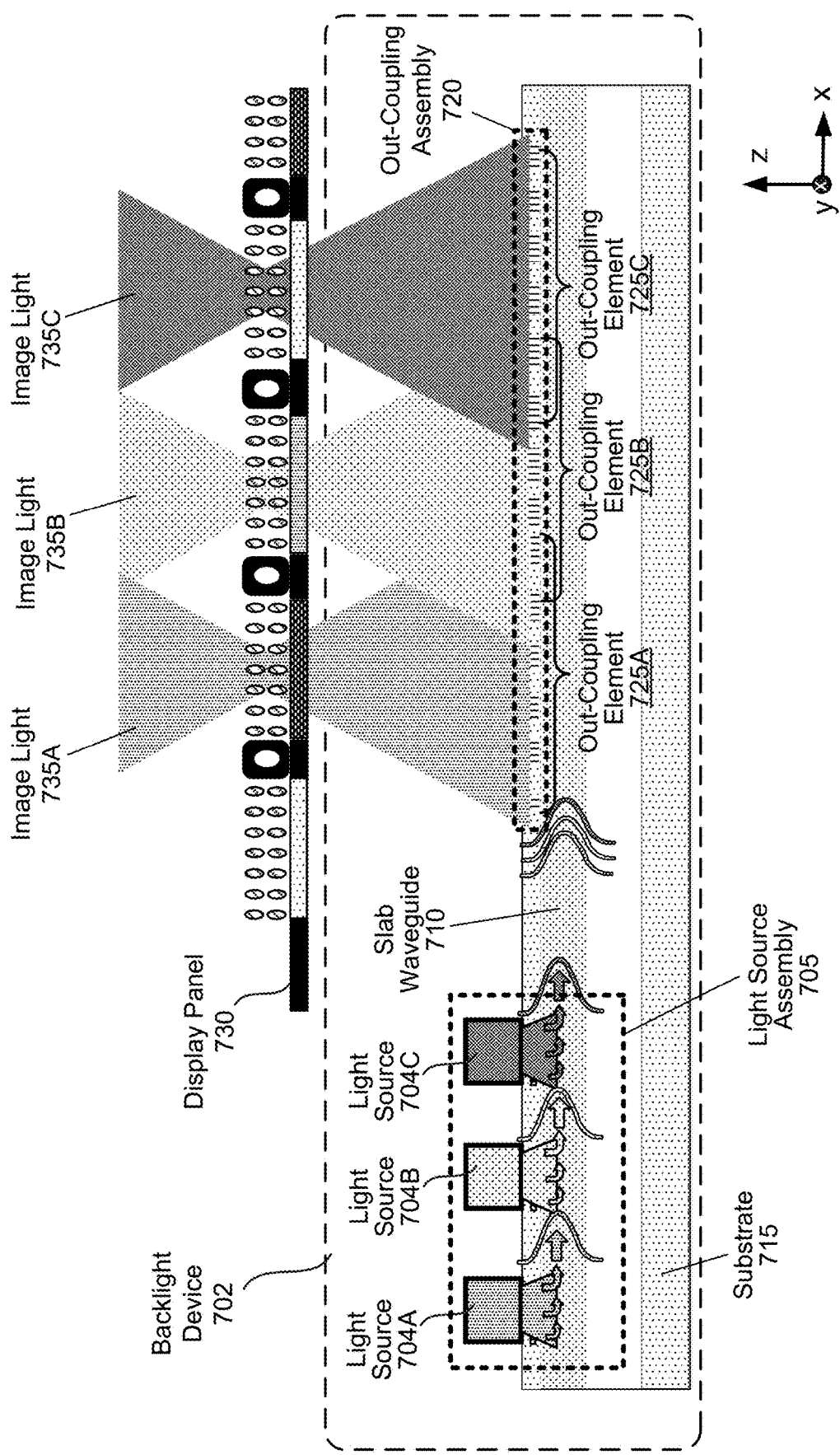
FIG. 7 is a side view of a portion of a backlight device in connection to a display panel, in accordance with one or more embodiments.

FIG. 7 is a side view 700 of a portion of a backlight device 702 in connection to a display panel 730 (i.e., light modulation layer), in accordance with one or more embodiments. The backlight device 702 may include a light source assembly 705 with a plurality of light sources (e.g., light sources 704A, 704B, 704C), a slab waveguide 710, and an out-coupling assembly 720 placed on top of a substrate 715. The backlight device 702 may be an embodiment of the backlight device 300, the light source assembly 705 may be an embodiment of the light source assembly 305, the slab waveguide 710 may be an embodiment of the slab waveguide 320, and the out-coupling assembly 720 may be an embodiment of the out-coupling assembly 325.

Each of the light sources 704A, 704B, 704C may emit light of a respective color (e.g., red, green, and blue color). The slab waveguide 710 may in-couple light of different colors, expand and propagate the in-coupled light of different colors in an in-plane direction (e.g., along x-y plane) towards the out-coupling assembly 720. The out-coupling assembly 720 may include out-coupling elements 725A, 725B, 725C. The out-coupling element 725A may be configured to out-couple light of a first color (e.g., red color) in an out-of-plane direction (e.g., z direction) towards the display panel 730; the out-coupling element 725B may be configured to out-couple light of a second color (e.g., green color) in the out-of-plane direction towards the display panel 730; and the out-coupling element 725C may be configured to out-couple light of a third color (e.g., blue color) in the out-of-plane direction towards the display panel 730. Each of the out-coupling elements 725A, 725B, 725C may be implemented as a wavelength-selective scatterer or grating (e.g., guided-mode resonance-based meta-grating). The display panel 730 may spatially modulate light of the different colors to generate a color image. The display panel 730 may be implemented as an array of multi-color LC cells (i.e., multi-color LC panel), or some other intensity modulation panel. The display panel 730 may be an embodiment of the display panel 250.

As shown in FIG. 7, out-coupling regions for neighboring pixels of different colors of the out-coupling assembly 720 can be spatially overlapped to increase an effective out-coupling beam size for each color. The effective out-coupling light beams may be consequently focused (e.g., by the display panel 730) into smaller area sizes at a distance, which would reduce the amount of perceived dark matrix. This feature of the out-coupling assembly 720 may facilitate integration of the backlight device 702 with the display panel 730 having, e.g., the multi-color LC cells. Thus, a size of each out-coupling pixel at the out-coupling assembly 720 may be larger than a size of actual pixel on the display panel 730.

Figure 8A:
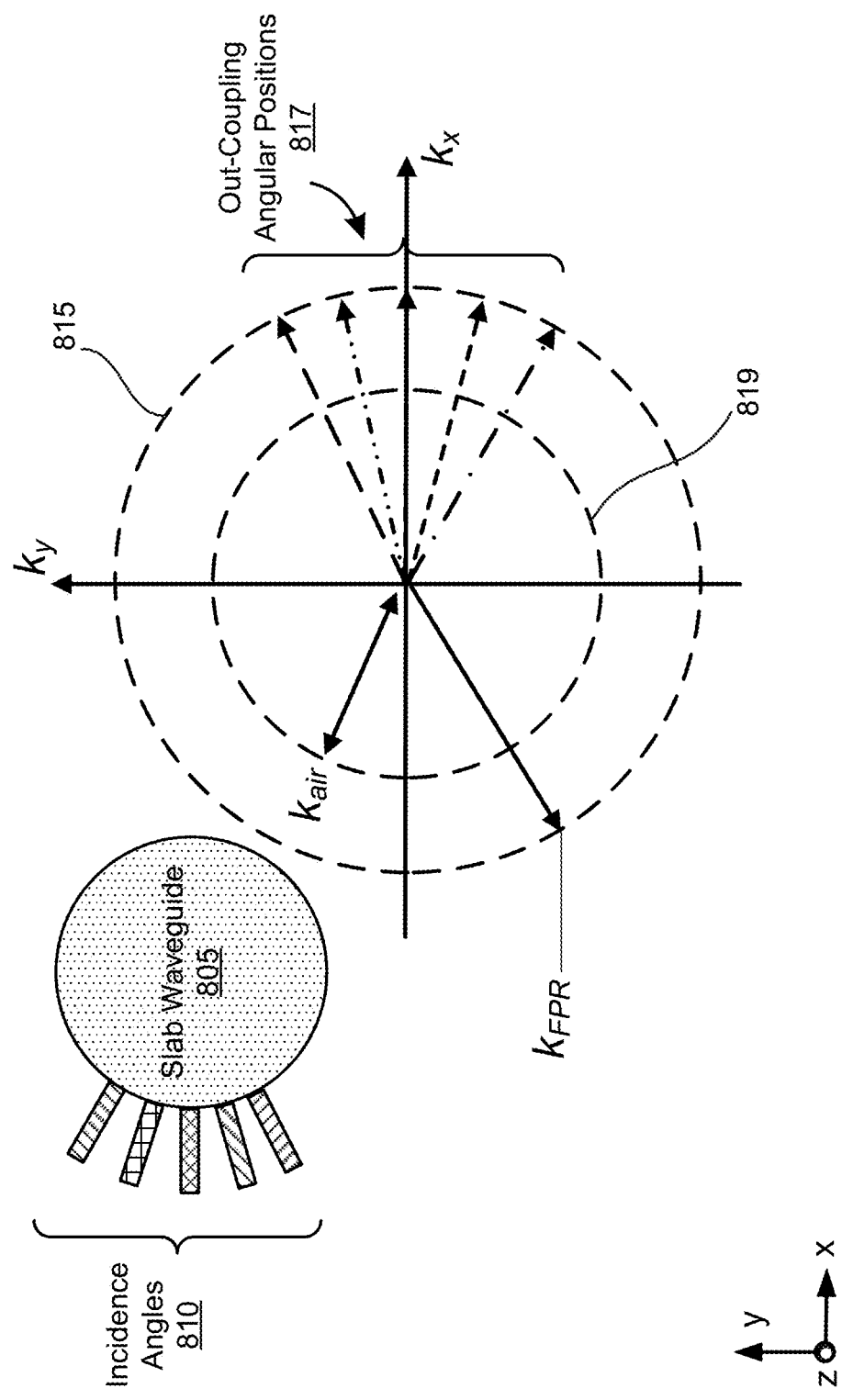
FIG. 8A illustrates different out-coupling angular positions for different incidence angles at a slab waveguide of a backlight device, in accordance with one or more embodiments.

FIG. 8A illustrates different out-coupling angular positions for different incidence angles at a slab waveguide 805 of a backlight device (e.g., the backlight device 300), in accordance with one or more embodiments. The slab waveguide 805 may be an embodiment of the slab waveguide 320. Different incidence angles 810 of a single slab mode of light incident at the slab waveguide 805 may correspond to different angular positions of vectors on a circle 815 with radius $k_{FPR}$ in the k-space. The circle 815 represents k-vectors of light waves propagating within the slab waveguide 805. The different angular positions of vectors on the circle 815 may be associated with different out-coupling angular positions 817 at an out-coupling assembly (e.g., the out-coupling assembly 325) of the backlight device. Thus, each incidence angle 810 on the slab waveguide 805 may produce a respective out-coupling angular position 817 at an output of the backlight device. A circle 819 with radius $k_{air}$ represents a range of light fields that can propagate in the air, so that the propagating light fields can leave a plane of the slab waveguide 805.

Figure 8B:
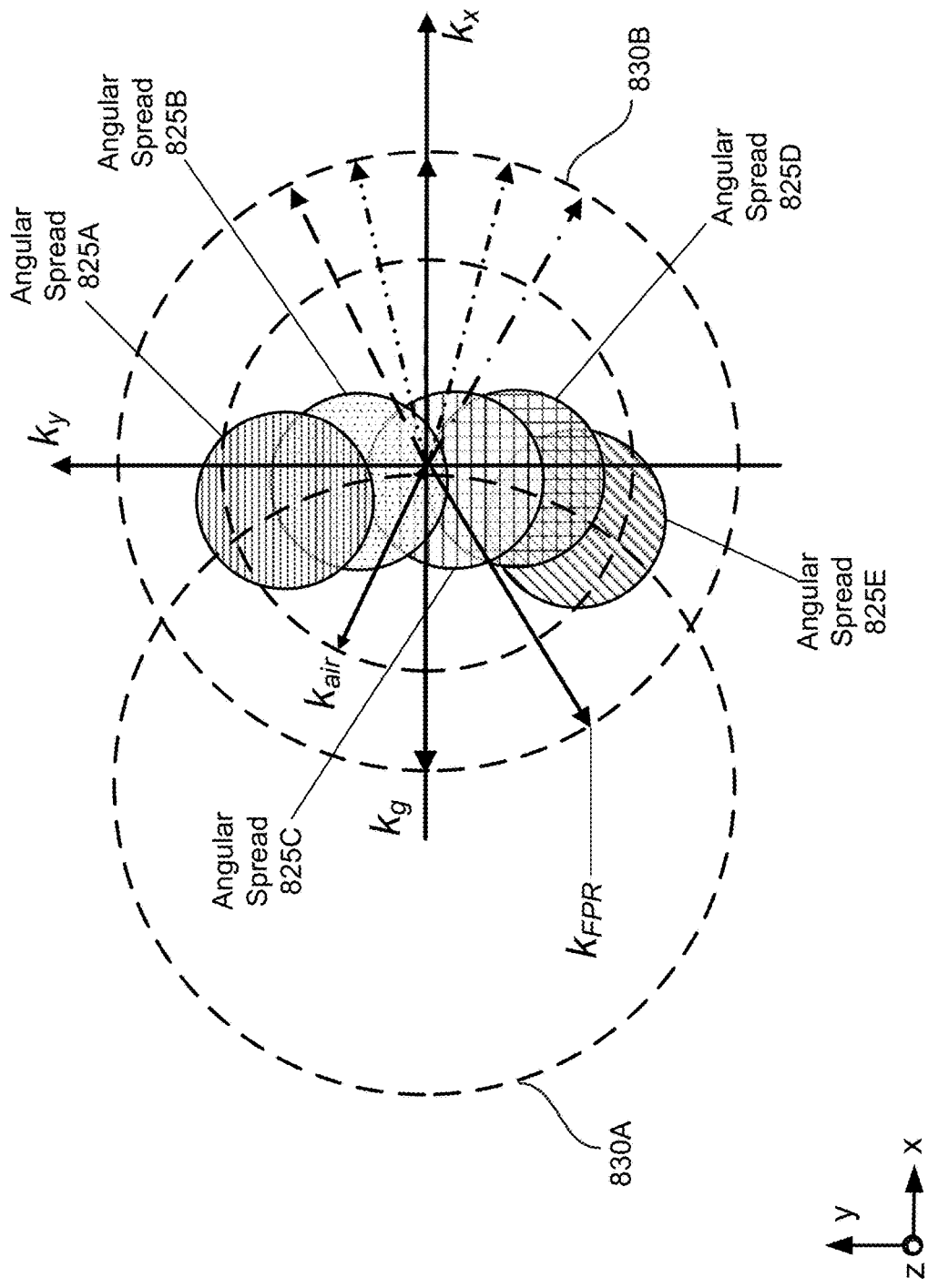
FIG. 8B illustrates examples of angular spreads for different incident fields of a slab waveguide of a backlight device, in accordance with one or more embodiments.

FIG. 8B illustrates examples 820 of angular spreads for different incident fields at the slab waveguide 805 (e.g., the incidence angles 810 of FIG. 8A), in accordance with one or more embodiments. A grating pixel at the out-coupling assembly may shift each incidence k by $k_g$, and add a spread that may be limited by a size of the grating pixel. If light is incident to the slab waveguide 805 from different sides of the slab waveguide 805 (e.g., from different incidence angles 810), different arcs of angular spread 825A, 825B, 825C, 825D, 825E may be achieved to cover a wide range of field-of-views. Circles 830A and 830B represent an in-plane wave-vector range supported by a structure of the slab waveguide 805 before and after interaction with a grating of the out-coupling assembly.

A de-speckling mechanism applied at a light source assembly (e.g., the light source assembly 305) of the backlight device may result into randomized relative phases the angular spreads 825A, 825B, 825C, 825D, 825E. An amplitude of each angular spread 825A, 825B, 825C, 825D, 825E may be also controlled by the de-speckling mechanism. In some embodiments, a plurality of mutually-incoherent light sources of the light source assembly may be coupled into each light guide of the light source assembly (e.g., the light source assembly 525). In such case, each output light cone (e.g., at the out-coupling assembly) may be mutually incoherent, which may consequently reduce (and, in some embodiments, minimize) the speckling effect.

Figure 9A:
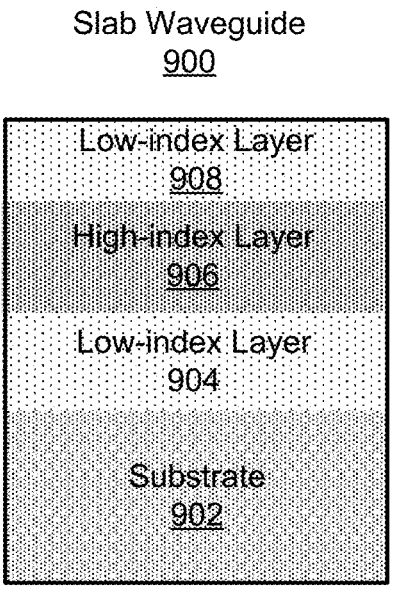
FIG. 9A illustrates an example slab waveguide with a single high-index layer configuration, in accordance with one or more embodiments.

FIG. 9A illustrates an example slab waveguide 900 (i.e., light expansion region or free-propagation region) with a single high-index layer configuration, in accordance with one or more embodiments. The slab waveguide 900 is a layered structure that bounds light in an out-of-plane direction (e.g., z direction). The slab waveguide 900 may comprise a plurality of layers 904, 906, 908 with various refractive indices stacked on a substrate 902 to confine light in the out-of-plane direction. The slab waveguide 900 may include a low-index layer 904 with a first refractive index, a high-index layer 906 with a second refractive index that is higher than the first refractive index, and a low-index layer 908 with a third refractive index that is lower than the second refractive index. One or more of the layers 904, 906, 908 may have structures (e.g., folding mirror structures) along in-plane directions (e.g., x and y directions) to facilitate the light propagation with total internal reflection. Light from one or more input waveguides of a light source assembly (not shown in FIG. 9A) in-coupled by the slab waveguide 900 may expand in the in-plane directions as approaching an out-coupling region of an out-coupling assembly (not shown in FIG. 9A) that out-couples the expanded light in an out-of-plane direction (e.g., z direction). One or more of the layers 904, 906, 908 may be etched with gratings to form out-coupling elements of the out-coupling assembly. The substrate 902 may potentially be mirrored to facilitate out-coupling of light. The slab waveguide 900 may be an embodiment of the slab waveguide 320.

Figure 9B:
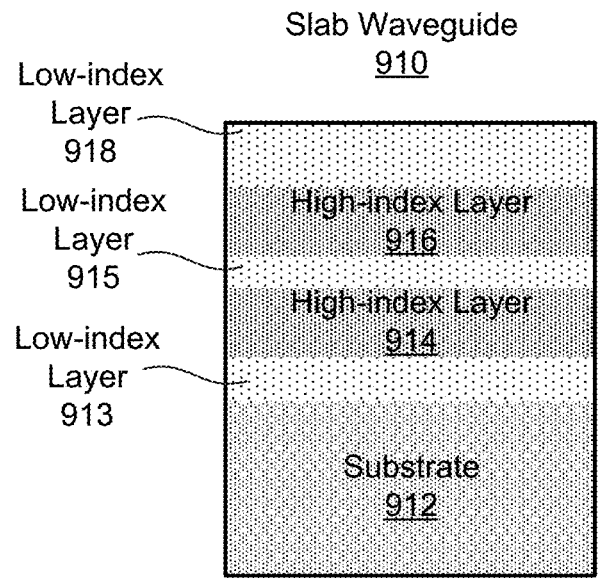
FIG. 9B illustrates an example slab waveguide with a two-high-index layer configuration, in accordance with one or more embodiments.

FIG. 9B illustrates an example slab waveguide 910 (i.e., light expansion region or free-propagation region) with a two-high-index layer configuration, in accordance with one or more embodiments. The slab waveguide 910 is a layered structure that bounds light in an out-of-plane direction (e.g., z direction). The slab waveguide 910 may comprise a plurality of layers 913, 914, 915, 916, 918 with various refractive indices stacked on a substrate 912 to confine light in the out-of-plane direction. The slab waveguide 910 may include a low-index layer 913 with a first refractive index, a low-index layer 915 with a third refractive index, and a low-index layer 918 with a fifth refractive index. The slab waveguide 910 may further include a high-index layer 914 sandwiched between the low-index layers 913 and 915, the high-index layer 914 having a second refractive index higher than any of the first, third and fifth refractive indices. The slab waveguide 910 may further include a high-index layer 916 sandwiched between the low-index layers 915 and 918, the high-index layer 916 having a fourth refractive index higher than any of the first, third and fifth refractive indices. Multiple high-index layers 914, 916 may provide an additional degree of freedom for the slab waveguide 910 (e.g., relative to the slab waveguide 900 with the single high-index layer 906) to control light propagation and out-coupling performance over the visible range.

One or more of the layers 913, 914, 915, 916, 918 may have structures (e.g., folding mirror structures) along in-plane directions (e.g., x and y directions) to facilitate the light propagation with total internal reflection. Light from one or more input waveguides of a light source assembly (not shown in FIG. 9B) in-coupled by the slab waveguide 910 may expand in the in-plane directions as approaching an out-coupling region of an out-coupling assembly (not shown in FIG. 9B) that out-couples the expanded light in the out-of-plane direction (e.g., z direction). One or more of the layers 913, 914, 915, 916, 918 may be etched with gratings to form out-coupling elements of the out-coupling assembly. The substrate 912 may potentially be mirrored to facilitate out-coupling of light. The slab waveguide 910 may be an embodiment of the slab waveguide 320.

Figure 9C:
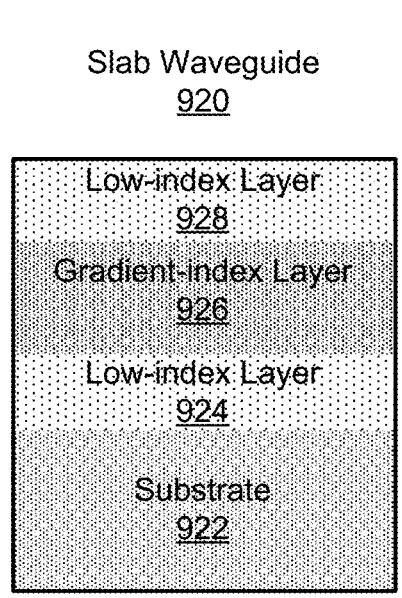
FIG. 9C illustrates an example slab waveguide with a single-gradient-index layer configuration, in accordance with one or more embodiments.
Figure 9C:
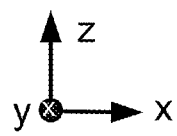

FIG. 9C illustrates an example slab waveguide 920 (i.e., light expansion region or free-propagation region) with a single-gradient-index layer configuration, in accordance with one or more embodiments. The slab waveguide 920 is a layered structure that bounds light in an out-of-plane direction (e.g., z direction). The slab waveguide 920 may comprise a plurality of layers 924, 926, 928 with various refractive indices stacked on a substrate 922 to confine light in the out-of-plane direction. The slab waveguide 920 may include a low-index layer 924 with a first refractive index, a low-index layer 928 with a second refractive index, and a gradient-index layer 926 sandwiched between the low-index layers 924 and 928. The gradient-index layer 926 may have a modulated index profile along the out-of-plane direction (e.g., z direction) higher than the first and second refractive indices to confine light in the out-of-plane direction. One or more of the layers 924, 926, 928 may have structures (e.g., folding mirror structures) along in-plane directions (e.g., x and y directions) to facilitate the light propagation with total internal reflection. Light from one or more input waveguides of a light source assembly (not shown in FIG. 9C) in-coupled by the slab waveguide 920 may expand in the in-plane directions as approaching an out-coupling region of an out-coupling assembly (not shown in FIG. 9C) that out-couples the expanded light in the out-of-plane direction (e.g., z direction). One or more of the layers 924, 926, 928 may be etched with gratings to form out-coupling elements of the out-coupling assembly. The substrate 922 may potentially be mirrored to facilitate out-coupling of light. The slab waveguide 920 may be an embodiment of the slab waveguide 320.

Although FIG. 9C includes one gradient-index layer, it should be understood that a slab waveguide may include more than one gradient-index layer. For example, each high-index layer 914, 916 of the slab waveguide 910 in FIG. 9B may be replaced with a respective gradient-index layer of a corresponding modulated index profile along the out-of-plane direction (e.g., z direction).

Figure 10A:
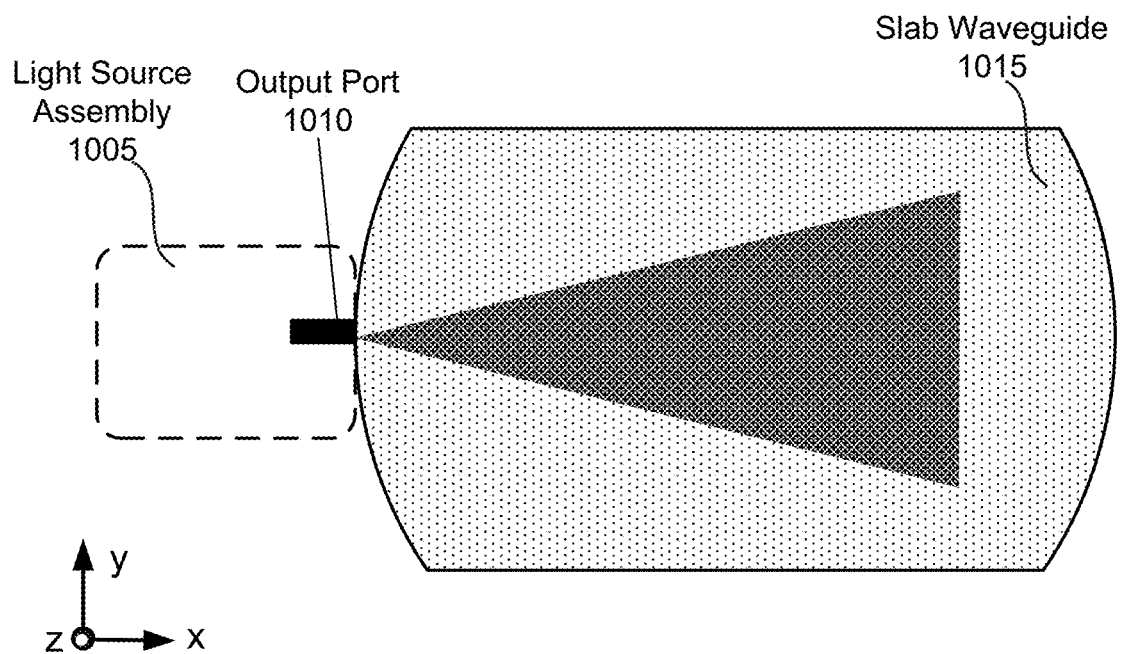
FIG. 10A is a top view of a portion of a backlight device illustrating a light source assembly coupled to a slab waveguide via an output port, in accordance with one or more embodiments.

FIG. 10A is a top view 1000 of a portion of a backlight device illustrating a light source assembly 1005 coupled to a slab waveguide 1015 via an output port 1010, in accordance with one or more embodiments. The light source assembly 1005 may be an embodiment of the light source assembly 305, and the slab waveguide 1015 may be an embodiment of the slab waveguide 320. Although a single output port 1010 of the light source assembly 1005 is shown in FIG. 10A, it should be understood that the light source assembly 1005 may include multiple output ports coupled to the slab waveguide 1015. The slab waveguide 1015 may be optically uniform or semi-uniform to support uniform or nearly uniform the in-plane propagation of light launched from the output port 110 (e.g., propagation in the x-y plane) with the out-of-plane confinement (e.g., confinement in the plane that includes z direction).

Figure 10B:
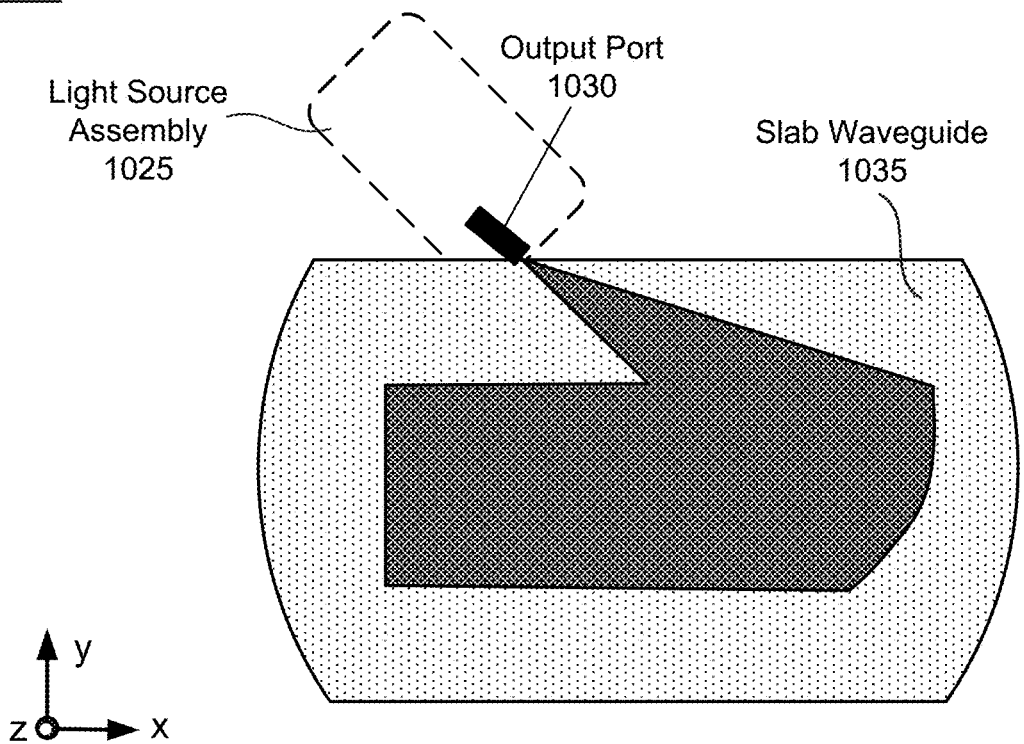
FIG. 10B is a top view of a portion of a backlight device illustrating a light source assembly coupled, via an output port, to a slab waveguide with a folded light path, in accordance with one or more embodiments.

FIG. 10B is a top view 1020 of a portion of a backlight device illustrating a light source assembly 1025 coupled, via an output port 1030, to a slab waveguide 1035 with a folded light path, in accordance with one or more embodiments. The light source assembly 1025 may be an embodiment of the light source assembly 305, and the slab waveguide 1035 may be an embodiment of the slab waveguide 320. Although a single output port 1030 of the light source assembly 1025 is shown in FIG. 10B, it should be understood that the light source assembly 1055 may include multiple output ports coupled to the slab waveguide 1015. The slab waveguide 1035 may include at least one reflector element, at least one deflector element, at least one diffractor element, or some combination thereof that modifies the in-plane propagation direction of light launched from the output port 1030 to provide the folded light path. The folded light path provided by the slab waveguide 1035 may have the out-of-plane confinement (e.g., confinement in the plane that includes z direction). Benefits of utilizing the slab waveguide 1035 with folded optical path can be, e.g., to increase a field-of-view of out-coupled light, achieve sufficient flexibility for placing an out-coupling region into the slab waveguide 1035, achieve a smaller form factor of the slab waveguide 1035, etc.

Figure 11:
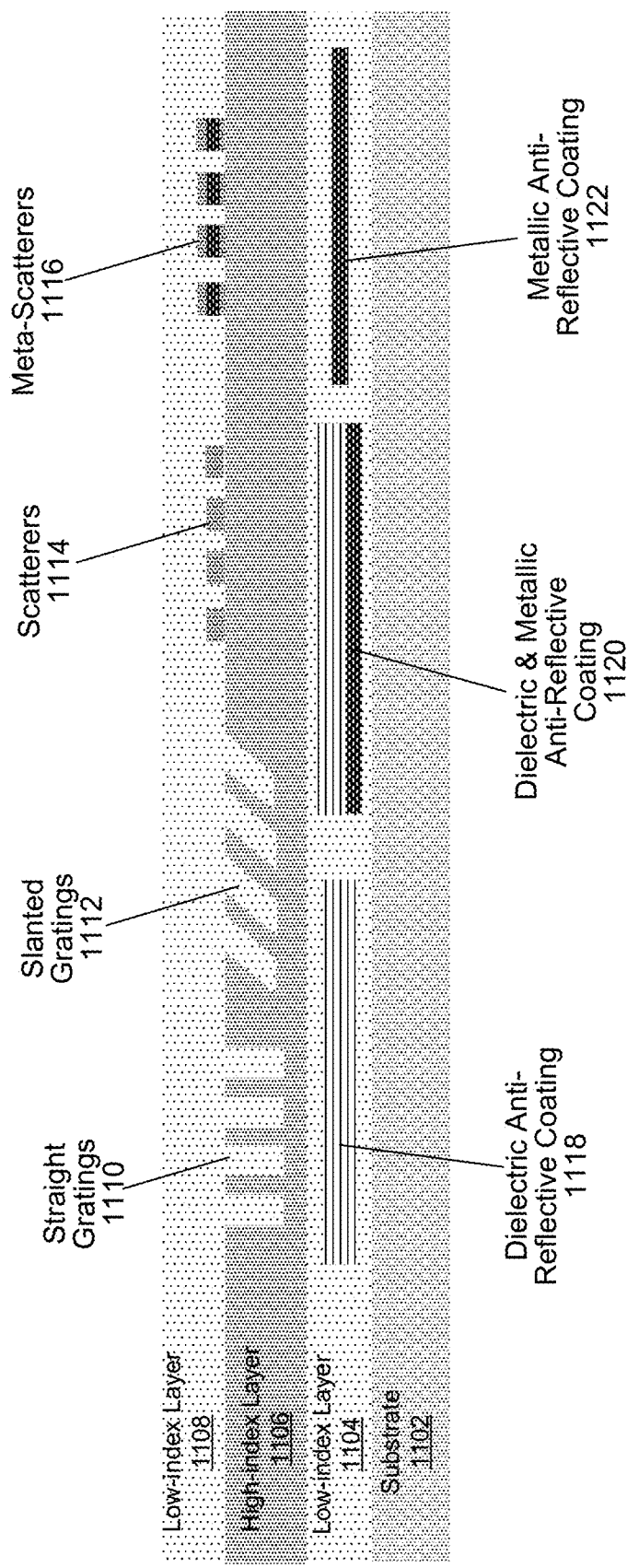
FIG. 11 illustrates examples of out-coupling elements of an out-coupling assembly in a backlight device, in accordance with one or more embodiments.

FIG. 11 illustrates examples of out-coupling elements of an out-coupling assembly (e.g., the out-coupling assembly 325 or the out-coupling assembly 600) in a backlight device, in accordance with one or more embodiments. The out-coupling elements illustrated in FIG. 11 may be embodiments of the out-coupling elements 632 of the out-coupling assembly 600. As shown in FIG. 11, the out-coupling assembly may include different out-coupling elements attached to (or etched into) a plurality of layers 1104, 1106, 1108 with various refractive indices stacked on a substrate 1102 to confine propagation (i.e., out-coupling) of light in the out-of-plane direction (e.g., z direction). The layer 1004 may be a low-index layer with a first refractive index, the layer 1008 may be a low-index layer with a third refractive index, and the layer 1006 may be a high-index layer sandwiched between the low-index layers 1104 and 1108 having a second refractive index higher than the first and second refractive indices. The layers 1104, 1106, 1108 and the substrate 1102 may be part of a slab waveguide (the slab waveguide 900). Alternatively, at least one of the layers 1104, 1106, 1108 and the substrate 1102 may be part of the out-coupling assembly.

The low index layer 1108 may include an array of scatterer groups for scattering light in the out-of-plane direction (e.g., z direction). The array of scatterer groups may be, e.g., an array of scatterers 1114, an array of meta-scatterers 1116, other type of scatterer array, or some combination thereof. The array of scatterer groups in the low index layer 1108 may include non-resonant structures and/or resonant structures fabricated in the vicinity of the low index layer 1108 and the high-index layer 1106. The array of scatterer groups may be implemented as etchings in the low index layer 1108. Alternatively, the array of scatterer groups may be implemented as scattering elements of different shapes (e.g., of round pillar shape, square pillar shape, etc.) placed on top of the high-index layer 1106.

The high-index layer 1106 may include an array of grating couplers with one-dimensional, two-dimensional, three-dimensional profile of a tooth structure, etc. for diffracting light in the out-of-plane direction (e.g., z direction). The array of grating couplers may be etched into the high-index layer 1106 as, e.g., an array of straight gratings 1110, an array of slanted gratings 1112, other type of grating array, or some combination thereof. Alternatively, the array of grating couplers may be placed on top side of the high-index layer 1106, on bottom side of the high-index layer 1106, or on both sides of the high-index layer 1106. In some embodiments, one or more additional optical elements (e.g., lenslets) coupled to or etched into the low index layer 1108 may be utilized to direct light in the out-of-plane direction (e.g., z direction).

The low index layer 1104 may include an anti-reflective (AR) coating to increase the coupling efficiency and reduce unwanted leakage/loss between a slab waveguide and an outcoupling assembly. In one embodiment, the AR coating is implemented at the low index layer 1104 as a dielectric AR coating 1118 that includes one or more stacked layers of dielectric materials. In another embodiment, the AR coating is implemented at the low index layer 1104 as a dielectric and metallic AR coating 1120 that includes stacked layers of dielectric and metallic (or semiconductor) materials. In yet another embodiment, the AR coating is implemented at the low index layer 1104 as a metallic AR coating 1122 that includes one or more stacked layers of metallic (or semiconductor) materials. One or more of the AR coatings 1118, 1120, 1122 may be embedded into the low index layer 1104. Alternatively, one or more of the AR coatings 1118, 1120, 1122 may be applied to the substrate 1102 before the low index layer 1104 is applied on top of the substrate 1102.

Out-coupling elements (i.e., the array of scatterer groups and/or array of grating couplers) illustrated in FIG. 11 can be designed (tailored) differently across the entire out-coupling region (i.e., out-coupling assembly) to provide uniform back-light amplitude for a light modulation layer. In some embodiments, the out-coupling assembly includes electronic bus lines for transmitting power, control information and data. The out-coupling assembly may further include integrated electronic circuitry for active liquid crystal (or other active photonic material) cell control. The integrated electronic circuitry in the out-coupling assembly may include electronic-conductive vias through photonic structures to be connected to light modulation cells of a light modulation layer.

FIG. 12A is a top view of an out-coupling assembly 1200 with spatially non-overlapping out-coupling elements 1205, in accordance with one or more embodiments. The out-coupling assembly 1200 may be an embodiment of the out-coupling assembly 325. The out-coupling elements 1205 may be implemented as an array of spatially non-overlapping grating elements attached to a slab waveguide. The coupling elements 1205 may be configured to out-couple light of a single wavelength or of multiple wavelengths.

FIG. 12B is a top view of an out-coupling assembly 1210 with spatially overlapping out-coupling elements 1215, in accordance with one or more embodiments. The out-coupling assembly 1210 may be an embodiment of the out-coupling assembly 325. The out-coupling elements 1215 may be implemented as an array of spatially overlapping grating elements attached to a slab waveguide. The coupling elements 1215 may be configured to out-couple light of a single wavelength or of multiple wavelengths.

Figures 12C, 12D:
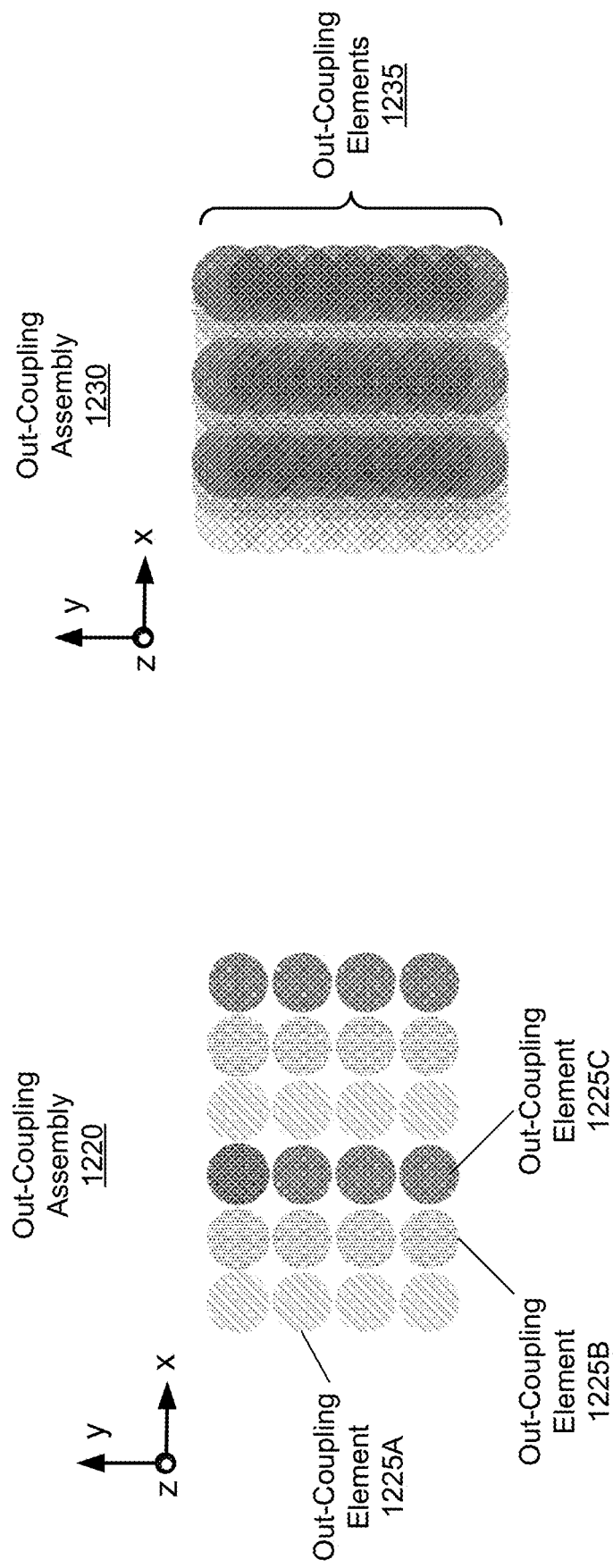
FIG. 12C is a top view of an out-coupling assembly with multiple groups of spatially non-overlapping out-coupling elements, in accordance with one or more embodiments.
FIG. 12D is a top view of an out-coupling assembly with multiple groups of spatially overlapping out-coupling elements, in accordance with one or more embodiments.

FIG. 12C is a top view of an out-coupling assembly 1220 with multiple groups of spatially non-overlapping out-coupling elements, in accordance with one or more embodiments. The out-coupling assembly 1220 may include multiple groups of spatially non-overlapping out-coupling elements for out-coupling light of multiple wavelengths (i.e., color channels). A first group of spatially non-overlapping out-coupling elements 1225A may be configured to out-couple light of a first wavelength (i.e., first color, such as Red color); a second group of spatially non-overlapping out-coupling elements 1225B may be configured to out-couple light of a second wavelength (i.e., second color, such as Green color); and a third group of spatially non-overlapping out-coupling elements 1225C may be configured to out-couple light of a third wavelength (i.e., third color, such as Blue color). While shown in FIG. 12C as columns of individual color channels, in other embodiments, the out-coupling elements 1225A, 1225B, 1225C may have some other arrangement (e.g., substantially similar to a Bayer pattern).

FIG. 12D is a top view of an out-coupling assembly 1230 with multiple groups of spatially overlapping out-coupling elements 1235, in accordance with one or more embodiments. The out-coupling assembly 1230 may include multiple groups of spatially overlapping out-coupling elements 1235 for out-coupling light of multiple wavelengths (i.e., color channels). A first group (i.e., first subset) of the spatially overlapping out-coupling elements 1235 may be configured to out-couple light of a first wavelength (i.e., first color, such as Red color); a second group (i.e., second subset) of the spatially overlapping out-coupling elements 1235 may be configured to out-couple light of a second wavelength (i.e., second color, such as Green color); and a third group (i.e., third subset) of the spatially overlapping out-coupling elements 1235 may be configured to out-couple light of a third wavelength (i.e., third color, such as Blue color). While shown in FIG. 12D as columns of individual color channels, in other embodiments, the out-coupling elements 1235 may have some other arrangement (e.g., substantially similar to a Bayer pattern).

Figure 13:
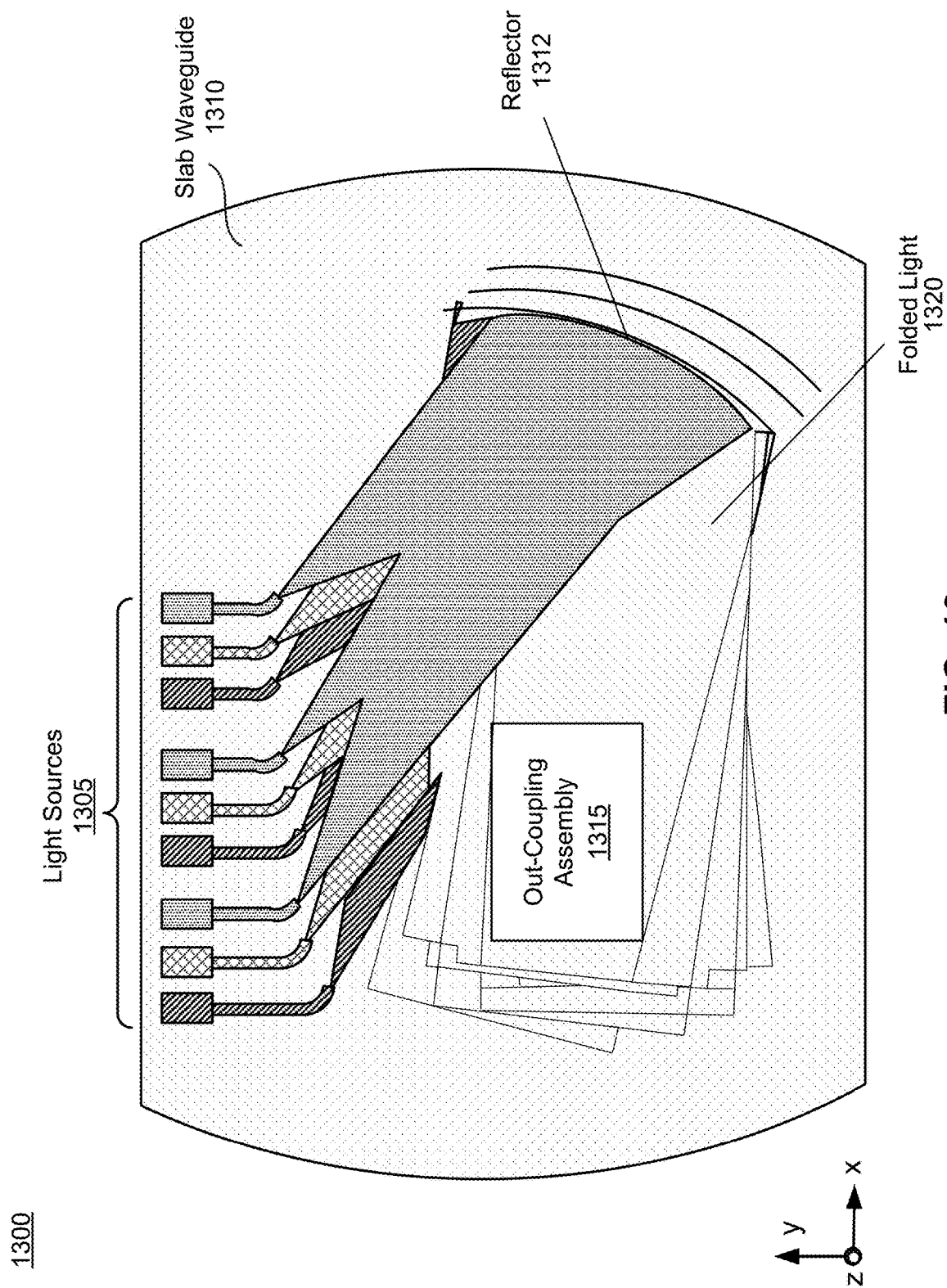
FIG. 13 is top view of a backlight device with a folded light path, in accordance with one or more embodiments.

FIG. 13 is top view of a backlight device 1300 with a folded light path, in accordance with one or more embodiments. The backlight device 1300 may include a plurality of light sources 1305 (e.g., as part of a light assembly, not shown in FIG. 13), a slab waveguide 1310, and an out-coupling assembly 1315. The backlight device 1300 may be an embodiment of the backlight device 300, the light sources 1305 may be part of the light assembly 305, the slab waveguide 1310 may be an embodiment of the slab waveguide 320, and the out-coupling assembly 1315 may be an embodiment of the out-coupling assembly 325. The light sources 1305 may generate light of multiple colors and directly guide the light of multiple colors into the slab waveguide 320 (i.e., light expansion region).

The slab waveguide 1310 may include a reflector 1312 that reflects the multi-color light propagating in the x-y plane, changes a propagating direction along the x-y plane, and generates folded light 1320 that propagates in different direction along the x-y plane. After propagating in the x-y plane along a folded light path, the folded light 1320 reaches a region of the slab waveguide 1310 occupied by the out-coupling assembly 1315. The out-coupling assembly 1315 may occupy the region of the slab waveguide 1310 where the folded light becomes substantially uniform. The out-coupling assembly 1315 may out-couple the folded light 1320 along the out-of-plane direction (e.g., along z direction) towards a light modulation layer (not shown in FIG. 13). Benefits of including the reflector 1312 into the slab waveguide 1310 that forms the folded light 1320 can be, e.g., to increase a field-of-view of light out-coupled by the out-coupling assembly 1315, achieve sufficient flexibility for placing an out-coupling region (i.e., the out-coupling assembly 1315) into the slab waveguide 1035, achieve a smaller form factor of the slab waveguide 1310, etc.

Figure 14:
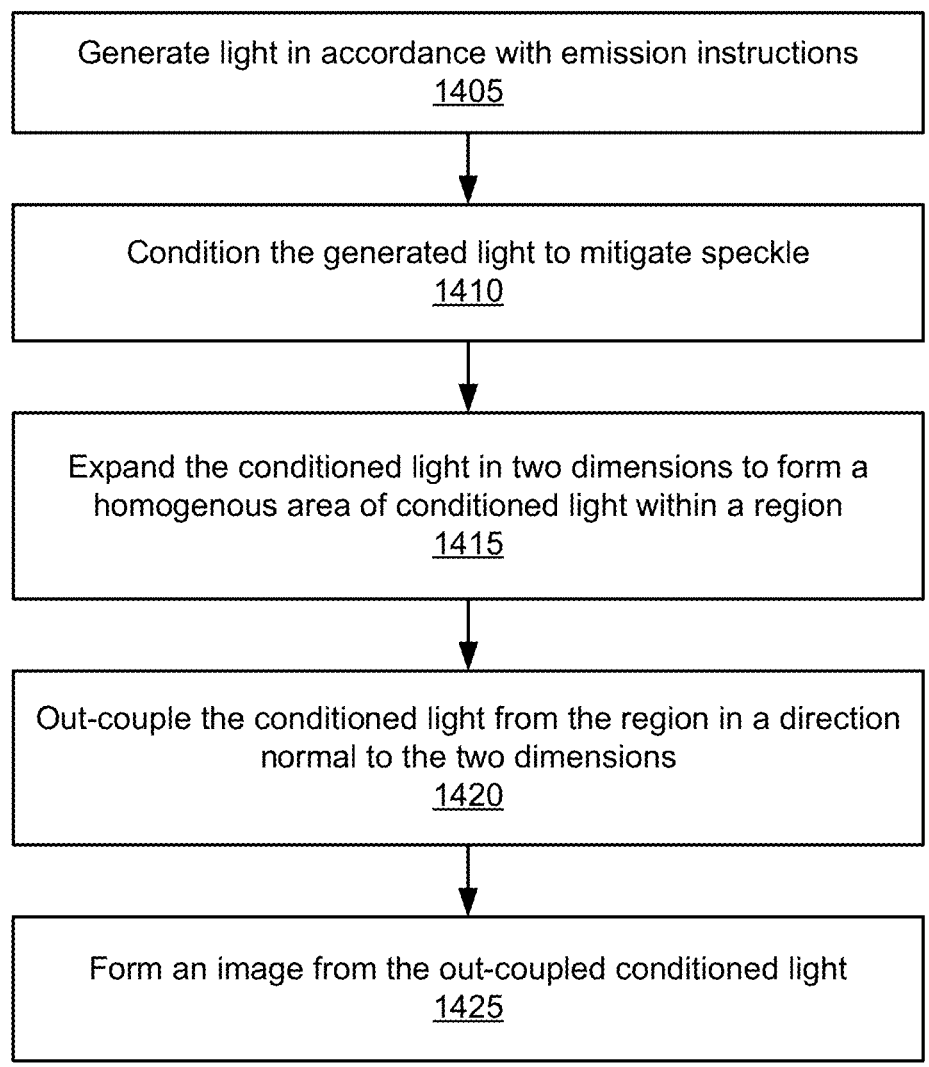
FIG. 14 is a flowchart illustrating a process of operating a backlight device, in accordance with one or more embodiments.

FIG. 14 is a flowchart illustrating a process 1400 of operating a backlight device, in accordance with one or more embodiments. The process 1400 shown in FIG. 14 may be performed by components of a display assembly (e.g., the display assembly 210) that includes a backlight device (e.g., the backlight device 240) and a display panel (e.g., the display panel 250). Other entities may perform some or all of the steps in FIG. 14 in other embodiments. Embodiments may include different and/or additional steps, or perform the steps in different orders.

The backlight device generates 1405 light (e.g., via one or more light sources of a light source assembly) in accordance with emission instructions. The one or more light sources may comprise a plurality of light sources configured to generate the light in a plurality of color channels. The one or more light sources may comprise at least one of: one or more lasers, one or more superluminescent light emitting devices, and one or more nonlinear light sources configured to generate the light. A single light source of the one or more light sources may feed with the generated light a plurality of ports of the light source assembly, and each port of the light source assembly may comprise a respective phase modulator coupled to a multi-mode slab waveguide of the backlight device. The one or more light sources may comprise a plurality of independent light sources configured to generate the light of the plurality of color channels. The plurality of independent light sources may directly guide the generated light of the plurality of color channels into the multi-mode slab waveguide comprising a light reflector that reflects the light of the plurality of color channels into a folded light path toward an out-coupling assembly of the backlight device.

The backlight device conditions 1410 (e.g., via a de-speckling mechanism) the generated light to mitigate speckle. The de-speckling mechanism may include a plurality of phase modulators configured to randomize phases of the generated light.

The backlight device expands 1415 (e.g., via the multi-mode slab waveguide) the conditioned light in two dimensions to form a homogenous area of conditioned light within a region of the multi-mode slab waveguide. The multi-mode slab waveguide may comprise one or more material layers on a substrate each having a different refractive index, the one or more material layers configured to expand the in-coupled conditioned light. The multi-mode slab waveguide may comprise at least one of: a reflector element, a deflector element, and a diffractor element configured to expand the in-coupled conditioned light.

The backlight device out-couples 1420 (e.g., via the out-coupling assembly) the conditioned light from the region of the multi-mode slab waveguide in a direction normal to the two dimensions. The out-coupling assembly may comprise one or more grating elements attached to the multi-mode slab waveguide. Alternatively, the out-coupling assembly may be etched into the multi-mode slab waveguide. In one or more embodiments, the out-coupling assembly comprises an array of grating couplers. In one or more other embodiments, the out-coupling assembly comprises an array of scatterer groups. The out-coupling assembly may include an anti-reflective coating on a side of the out-coupling assembly that is adjacent to the multi-mode slab waveguide.

The display assembly forms 1425 (e.g., via a light modulation layer) an image from the out-coupled conditioned light. A size of each out-coupling pixel on the out-coupling assembly may be larger than a size of a respective pixel on the light modulation layer. The display assembly with the backlight device presented herein can be integrated into a HMD (i.e., headset). Alternatively or additionally, the display assembly with the backlight device presented herein can be integrated into micro-display engines.

System Environment

Figure 15:
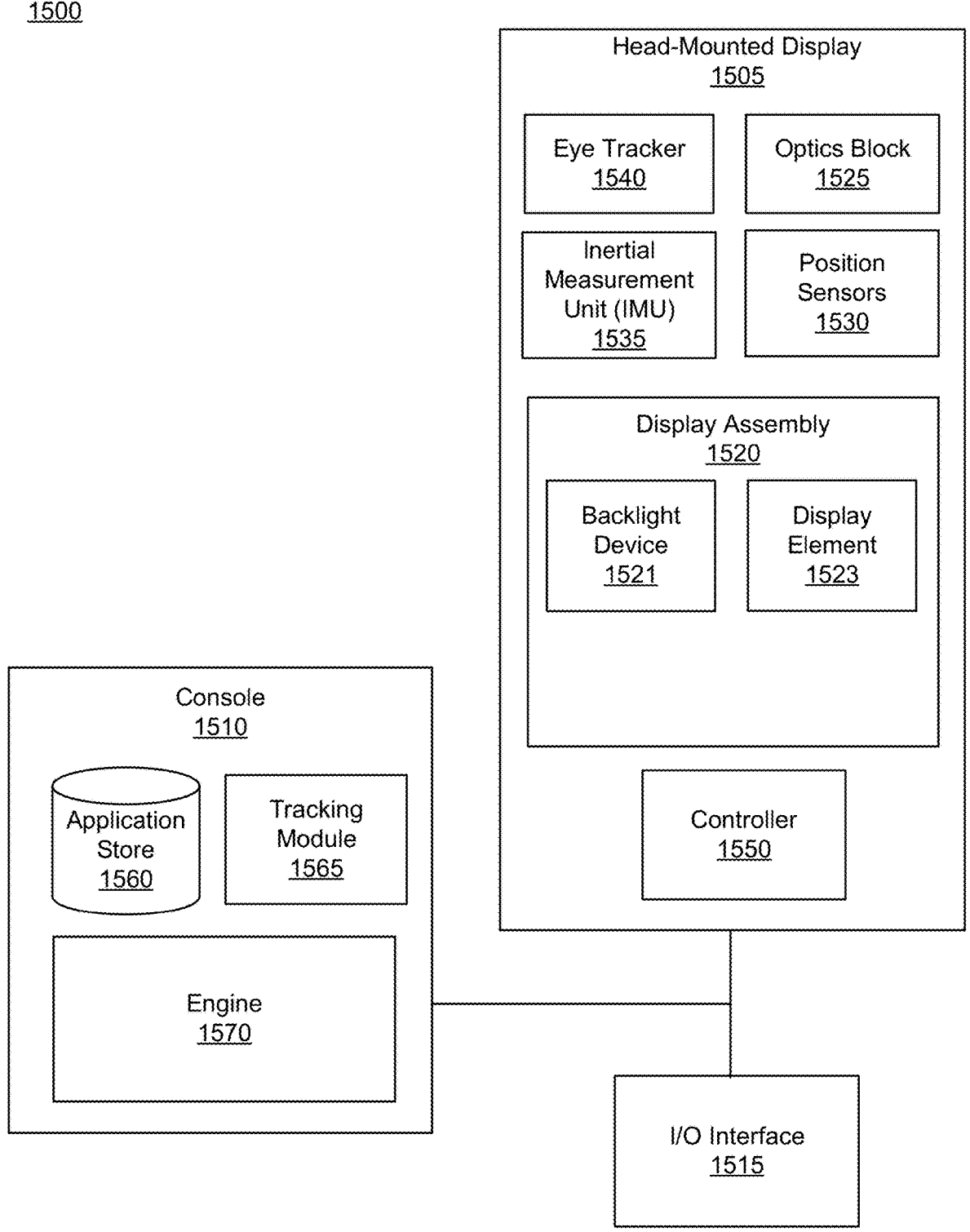
FIG. 15 is a block diagram of a system environment that includes a HMD, in accordance with one or more embodiments.

FIG. 15 is a block diagram of a system environment that includes a HMD, in accordance with one or more embodiments. The system 1500 may operate in an artificial reality environment, e.g., a virtual reality, an augmented reality, a mixed reality environment, or some combination thereof. The system 1500 shown by FIG. 15 comprises a HMD 1505 and an input/output (I/O) interface 1515 that is coupled to a console 1510. While FIG. 15 shows an example system 1500 including one HMD 1505 and on I/O interface 1515, in other embodiments any number of these components may be included in the system 1500. For example, there may be multiple HMDs 1505 each having an associated I/O interface 1515, with each HMD 1505 and I/O interface 1515 communicating with the console 1510. In alternative configurations, different and/or additional components may be included in the system 1500. Additionally, functionality described in conjunction with one or more of the components shown in FIG. 15 may be distributed among the components in a different manner than described in conjunction with FIG. 15 in some embodiments. For example, some or all of the functionality of the console 1510 is provided by the HMD 1505.

The HMD 1505 presents content to a user comprising virtual and/or augmented views of a physical, real-world environment with computer-generated elements (e.g., two-dimensional or three-dimensional images, two-dimensional or three-dimensional video, sound, etc.). In some embodiments, the presented content includes audio that is presented via an external device (e.g., speakers and/or headphones) that receives audio information from the HMD 1505, the console 1510, or both, and presents audio data based on the audio information. The HMD 1505 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. One embodiment of the HMD 1505 is the HMD 100 of FIG. 1A. Another embodiment of the HMD 1505 is the HMD 100 of FIG. 1B.

The HMD 1505 may include a display assembly 1520, an optics block 1525, one or more position sensors 1530, an inertial measurement unit (IMU) 1535, an eye tracker 1540, and a controller 1550. Some embodiments of the HMD 1505 have different and/or additional components than those described in conjunction with FIG. 15. Additionally, the functionality provided by various components described in conjunction with FIG. 15 may be differently distributed among the components of the HMD 1505 in other embodiments.

The display assembly 1520 displays two-dimensional or three-dimensional images to the user in accordance with data received from the console 1510. In various embodiments, the display assembly 1520 comprises a single display or multiple displays (e.g., a display for each eye of a user). The display assembly 1520 may include a backlight device 1521, and a display element 1523. An embodiment of the display assembly 1520 is the display assembly 210.

The backlight device 1521 emit light through the display element 1523. The backlight device 1521 may include a light source assembly, a multi-mode slab waveguide, and an out-coupling assembly. The light source assembly of the backlight device 1521 includes one or more light sources that generate light in accordance with emission instructions, and a de-speckling mechanism that conditions the generated light to mitigate speckle. The multi-mode slab waveguide of the backlight device 1521 in-couples the conditioned light and expands the in-coupled conditioned light in two dimensions to form a homogenous area of conditioned light within a region of the multi-mode slab waveguide. The out-coupling assembly of the backlight device 1521 out-couples the conditioned light from the region in a direction normal to the two dimensions, wherein a light modulation layer forms an image from the out-coupled conditioned light. An embodiment of the backlight device 1521 is the backlight device 240, the backlight device 300, the backlight device 400, the backlight device 430, the backlight device 600, the backlight device 700, or the backlight device 1300.

The display element 1523 may spatially modulate the light received from the backlight device 1521 to generate image light for presentation to a user wearing the HMD 1505. An example of the display element 1523 that operates as a spatial light modulator is a LCD. An embodiment of the display element 1523 is the display panel 730.

The optics block 1525 magnifies the image light received from the display assembly 1520, corrects optical errors associated with the image light, and presents the corrected image light to a user of the HMD 1505. In various embodiments, the optics block 1525 includes one or more optical elements. Example optical elements included in the optics block 1525 include: an aperture, a Fresnel lens, a convex lens, a concave lens, a filter, a reflecting surface, or any other suitable optical element that affects image light. Moreover, the optics block 1525 may include combinations of different optical elements. In some embodiments, one or more of the optical elements in the optics block 1525 may have one or more coatings, such as partially reflective or anti-reflective coatings.

Magnification and focusing of the image light by the optics block 1525 allows the display assembly 1520 to be physically smaller, weigh less, and consume less power than larger displays. Additionally, magnification may increase the field of view of the content presented by the display assembly 1520. For example, the field of view of the displayed content is such that the displayed content is presented using almost all (e.g., approximately 110 degrees diagonal), and in some cases all, of the user's field of view. Additionally, in some embodiments, the amount of magnification may be adjusted by adding or removing optical elements.

In some embodiments, the optics block 1525 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 1525 corrects the distortion when it receives image light from the electronic display generated based on the content.

The IMU 1535 is an electronic device that generates data indicating a position of the HMD 1505 based on measurement signals received from one or more of the position sensors 1530. A position sensor 1530 generates one or more measurement signals in response to motion of the HMD 1505. Examples of position sensors 1530 include: one or more accelerometers, one or more gyroscopes, one or more magnetometers, another suitable type of sensor that detects motion, a type of sensor used for error correction of the IMU 1535, or some combination thereof. The position sensors 1530 may be located external to the IMU 1535, internal to the IMU 1535, or some combination thereof. An embodiment of the position sensor 1535 is the position sensor 130.

The eye tracker 1540 may track a position of an eye of a user wearing the HMD 1505. In one or more embodiments, the eye tracker 1540 captures images of the user's eye, and provides the captured images to the controller 1550 for determining a gaze position for the user's eye. In one or more other embodiments, an internal controller of the eye tracker 1540 determines the gaze position for the user's eye. Information about the gaze position may include information about a position of a pupil of the user's eye.

The controller 1550 may control components of the display assembly 1520 and the eye tracker 1540. The controller 1550 may generate tracking instructions for the eye tracker 1540. In some embodiments, the controller 1550 receives one or more images of the user's eye 220 captured by the eye tracker 1540 and determines eye tracking information (i.e., gaze information or gaze position) using the captured images. The controller 1550 may further generate emission instructions for the display assembly 1520 based at least in part on the gaze information. The controller 1550 may provide the emission instructions to the backlight device 1521. The emission instructions from the controller 1550 may include electrical signals (e.g., voltage signals or current signals) that control light emission from the backlight device 1521. An embodiment of the controller 1550 is the controller 260.

The I/O interface 1515 is a device that allows a user to send action requests and receive responses from the console 1510. An action request is a request to perform a particular action. For example, an action request may be an instruction to start or end capture of image or video data or an instruction to perform a particular action within an application. The I/O interface 1515 may include one or more input devices. Example input devices include: a keyboard, a mouse, a game controller, or any other suitable device for receiving action requests and communicating the action requests to the console 1510. An action request received by the I/O interface 1515 is communicated to the console 1510, which performs an action corresponding to the action request. In some embodiments, the I/O interface 1515 includes an IMU 1535 that captures calibration data indicating an estimated position of the I/O interface 1515 relative to an initial position of the I/O interface 1515. In some embodiments, the I/O interface 1515 may provide haptic feedback to the user in accordance with instructions received from the console 1510. For example, haptic feedback is provided when an action request is received, or the console 1510 communicates instructions to the I/O interface 1515 causing the I/O interface 1515 to generate haptic feedback when the console 1510 performs an action.

The console 1510 provides content to the HMD 1505 for processing in accordance with information received from one or more of: the eye tracker 1540, the controller 1550, and the I/O interface 1515. In the example shown in FIG. 15, the console 1510 includes an application store 1560, a tracking module 1565, and an engine 1570. Some embodiments of the console 1510 have different modules or components than those described in conjunction with FIG. 15. Similarly, the functions further described below may be distributed among components of the console 1510 in a different manner than described in conjunction with FIG. 15.

The application store 1560 stores one or more applications for execution by the console 1510. An application is a group of instructions, that when executed by a processor, generates content for presentation to the user. Content generated by an application may be in response to inputs received from the user via movement of the HMD 1505 or the I/O interface 1515. Examples of applications include: gaming applications, conferencing applications, video playback applications, or other suitable applications.

The tracking module 1565 calibrates the system 1500 using one or more calibration parameters and may adjust one or more calibration parameters to reduce error in determination of the position of the HMD 1505 or of the I/O interface 1515. For example, the tracking module 1565 communicates a calibration parameter to the eye tracker 1540 to adjust the focus of the eye tracker 1540 to determine a gaze position of a user's eye more accurately. Calibration performed by the tracking module 1565 also accounts for information received from the IMU 1535 in the HMD 1505 and/or an IMU included in the I/O interface 1515. Additionally, if tracking of the HMD 1505 is lost, the tracking module 1565 may re-calibrate some or all of the system 1500.

The tracking module 1565 tracks movements of the HMD 1505 or of the I/O interface 1515 using information from the one or more position sensors 1530, the IMU 1535, or some combination thereof. For example, the tracking module 1565 determines a position of a reference point of the HMD 1505 in a mapping of a local area based on information from the HMD 1505. The tracking module 1565 may also determine positions of the reference point of the HMD 1505 or a reference point of the I/O interface 1515 using data indicating a position of the HMD 1505 from the IMU 1535 or using data indicating a position of the I/O interface 1515 from an IMU 1535 included in the I/O interface 1515, respectively. Additionally, in some embodiments, the tracking module 1565 may use portions of data indicating a position or the HMD 1505 from the IMU 1525 to predict a future location of the HMD 1505. The tracking module 1565 provides the estimated or predicted future position of the HMD 1505 or the I/O interface 1515 to the engine 1570.

The engine 1570 generates a three-dimensional mapping of the area surrounding the HMD 1505 (i.e., the "local area") based on information received from the HMD 1505. In some embodiments, the engine 1570 determines depth information for the three-dimensional mapping of the local area that is relevant for techniques used in computing depth. The engine 1570 may calculate depth information using one or more techniques in computing depth, such as the stereo based techniques, the structured light illumination techniques, and the time-of-flight techniques. In various embodiments, the engine 1570 uses the depth information to, e.g., update a model of the local area, and generate content based in part on the updated model.

The engine 1570 also executes applications within the system 1500 and receives position information, acceleration information, velocity information, predicted future positions, or some combination thereof, of the HMD 1505 from the tracking module 1565. Based on the received information, the engine 1570 determines content to provide to the HMD 1505 for presentation to the user. For example, if the received information indicates that the user has looked to the left, the engine 1570 generates content for the HMD 1505 that mirrors the user's movement in a virtual environment or in an environment augmenting the local area with additional content. Additionally, the engine 1570 performs an action within an application executing on the console 1510 in response to an action request received from the I/O interface 1515 and provides feedback to the user that the action was performed. The provided feedback may be visual or audible feedback via the HMD 1505 or haptic feedback via the I/O interface 1515.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A backlight device comprising:
   a light source assembly including:
      a plurality of light sources configured to generate light in accordance with emission instructions and in a plurality of color channels, and
      a de-speckling mechanism configured to condition the generated light to mitigate speckle;
   a multi-mode slab waveguide configured to in-couple the conditioned light and expand the in-coupled conditioned light in two dimensions to form a homogenous area of conditioned light within a region of the multi-mode slab waveguide; and
   an out-coupling assembly configured to out-couple the conditioned light from the region in a direction normal to the two dimensions, wherein a light modulation layer forms an image from the out-coupled conditioned light.

2. The backlight device of claim 1, wherein the de-speckling mechanism includes a plurality of phase modulators configured to randomize phases of the generated light.

3. The backlight device of claim 1, wherein the plurality of light sources comprises at least one of:
   one or more lasers,
   one or more superluminescent light emitting devices, and
   one or more nonlinear light sources configured to generate the light.

4. The backlight device of claim 1, wherein a single light source of the plurality of light sources is configured to feed with the generated light a plurality of ports of the light source assembly, each port of the plurality of ports comprising a respective phase modulator coupled to the multi-mode slab waveguide.

5. The backlight device of claim 1, wherein the plurality of light sources comprises a plurality of independent light sources configured to directly guide the generated light of the plurality of color channels into the multimode slab waveguide, and wherein the multimode slab waveguide comprises a light reflector that reflects the light of the plurality of color channels into a folded light path toward the out-coupling assembly.

6. The backlight device of claim 1, wherein the multi-mode slab waveguide comprises one or more material layers on a substrate each having a different refractive index, the one or more material layers configured to expand the in-coupled conditioned light.

7. The backlight device of claim 1, wherein the multi-mode slab waveguide comprises at least one of: a reflector element, a deflector element, and a diffractor element configured to expand the in-coupled conditioned light.

8. The backlight device of claim 1, wherein the out-coupling assembly comprises one or more grating elements attached to the multi-mode slab waveguide.

9. The backlight device of claim 1, wherein the out-coupling assembly is etched into the multi-mode slab waveguide.

10. The backlight device of claim 1, wherein the out-coupling assembly comprises an array of grating couplers.

11. The backlight device of claim 1, wherein the out-coupling assembly comprises an array of scatterer groups.

12. The backlight device of claim 1, wherein the out-coupling assembly comprises an anti-reflective coating on a side of the out-coupling assembly that is adjacent to the multi-mode slab waveguide.

13. The backlight device of claim 1, wherein a size of each out-coupling pixel on the out-coupling assembly is larger than a size of a respective pixel on the light modulation layer.

14. The backlight device of claim 1, wherein the backlight device is integrated into a display assembly capable of being part of a head-mounted display.

15. A display assembly comprising:
   a display panel; and
   a backlight device coupled to the display panel, the backlight device comprising:
      a light source assembly comprising:
         a plurality of light sources configured to generate light in accordance with emission instructions and in a plurality of color channels, and
         a de-speckling mechanism configured to condition the generated light to mitigate speckle,
      a multi-mode slab waveguide configured to in-couple the conditioned light and expand the in-coupled conditioned light in two dimensions to form a homogenous area of conditioned light within a region of the multimode slab waveguide, and
      an out-coupling assembly configured to out-couple the conditioned light from the region in a direction normal to the two dimensions, wherein the display panel forms an image from the out-coupled conditioned light.

16. The display assembly of claim 15, wherein the light source assembly is further configured to directly guide the generated light of the plurality of color channels into the multimode slab waveguide, wherein the multimode slab waveguide comprises a light reflector that reflects the light of the plurality of color channels into a folded light path toward the out-coupling assembly.

17. The display assembly of claim 15, wherein:
   the plurality of light sources comprises at least one of: one or more lasers, one or more superluminescent light emitting devices, and one or more nonlinear light sources configured to generate the light;
   the multi-mode slab waveguide comprises one or more material layers on a substrate each having a different refractive index, the one or more material layers configured to expand the in-coupled conditioned light; and
   the out-coupling assembly comprises one or more grating elements attached to the multi-mode slab waveguide.

18. A backlight device comprising:
   a light source assembly comprising:
      one or more light sources configured to generate light in accordance with emission instructions, and
      a plurality of ports, wherein a single light source of the one or more light sources is configured to feed with the generated light the plurality of ports, and each port of the plurality of ports comprises a phase modulator configured to condition the generated light to mitigate speckle;

a multi-mode slab waveguide configured to in-couple the conditioned light from the plurality of ports, wherein each respective phase modulator of each port of the plurality of ports is coupled to the multi-mode slab waveguide, and to expand the in-coupled conditioned light in two dimensions to form a homogenous area of conditioned light within a region of the multi-mode slab waveguide; and an out-coupling assembly configured to out-couple the conditioned light from the region in a direction normal to the two dimensions, wherein a light modulation layer forms an image from the out-coupled conditioned light.

19. The backlight device of claim 18, wherein the light source assembly further comprises:

a bus waveguide configured to feed the generated light from the single light source to the plurality of ports.

20. The backlight device of claim 19, wherein the light source assembly further comprises:

a plurality of tap couplers coupled to the bus waveguide and to the plurality of ports, the plurality of tap couplers configured to feed the generated light from the bus waveguide to the plurality of respective phase modulators in each of the plurality of ports.

* * * * *